United States Patent
Sudo et al.

(10) Patent No.: US 6,345,036 B1
(45) Date of Patent: Feb. 5, 2002

(54) OFDM TRANSMITTING/RECEIVING DEVICE AND METHOD

(75) Inventors: Hiroaki Sudo; Kimihiko Ishikawa, both of Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/582,613

(22) PCT Filed: Nov. 4, 1999

(86) PCT No.: PCT/JP99/06126

§ 371 Date: Jun. 29, 2000

§ 102(e) Date: Jun. 29, 2000

(87) PCT Pub. No.: WO00/28687

PCT Pub. Date: May 18, 2000

(30) Foreign Application Priority Data

Nov. 6, 1998  (JP) .......................... 10-316414
Mar. 16, 1999 (JP) .......................... 11-070814
Apr. 8, 1999  (JP) .......................... 11-101733

(51) Int. Cl.$^7$ .......................... H04J 11/00; H04L 27/28
(52) U.S. Cl. ................ 370/203; 370/210; 370/481; 375/260; 375/265
(58) Field of Search ................ 375/222, 260, 375/261, 262, 263, 264, 265, 285, 346, 348, 349, 266, 267, 268, 269; 370/203, 209, 210, 213, 480, 481, 485, 419; 455/63, 522

(56) References Cited

U.S. PATENT DOCUMENTS

| | | | | |
|---|---|---|---|---|
| 5,307,376 A | * | 4/1994 | Castelain et al. | 3754/260 |
| 5,357,502 A | * | 10/1994 | Castelain et al. | 370/210 |
| 5,867,532 A | * | 2/1999 | Ito et al. | 375/265 |
| 6,009,073 A | * | 12/1999 | Kaneko | 370/203 |
| 6,125,103 A | * | 9/2000 | Bauml et al. | 370/203 |

FOREIGN PATENT DOCUMENTS

| | | |
|---|---|---|
| EP | 0600547 | 6/1994 |
| JP | 3254236 | 11/1991 |
| JP | 5268178 | 10/1993 |
| JP | 9215051 | 8/1997 |
| JP | 10107714 | 4/1998 |
| JP | 11205205 | 7/1999 |
| JP | 11289312 | 10/1999 |

* cited by examiner

Primary Examiner—Alpus H. Hsu
Assistant Examiner—Afsar M. Qureshi
(74) Attorney, Agent, or Firm—Stevens, Davis, Miller & Mosher, LLP

(57) ABSTRACT

An average value of reception power of subcarriers A to D is calculated by a control circuit 162, and the average value is divided by envelops of received signals of subcarriers A to D, respectively, so as to calculate a coefficient signal of each subcarrier. Multipliers 106 to 109 multiply transmitting signals of subcarriers A to D output from mapping circuits 102 to 105 by the coefficient signals, respectively. Whereby, power between the subcarriers at a reception time can be maintained substantially constant so as to improve an error rate characteristic.

13 Claims, 27 Drawing Sheets

OFDM TRANSMITTING/RECEIVING DEVICE AND METHOD

TECHNICAL FIELD

The present invention relates to an OFDM transmitting and receiving apparatus and its method for use in communication equipment of a digital radio communication system using OFDM.

BACKGROUND ART

In recent years, in digital radio communication system, the use of OFDM (Orthogonal Frequency Division Multiplexing), which is strong against noise and multipath interference, has been considered.

The following will explain signal processing of a conventional OFDM transmitting and receiving apparatus with reference to the drawings. FIG. 1 is a block diagram showing the configuration of the conventional OFDM transmitting and receiving apparatus. It is assumed that the number of subcarriers is four in FIG. 1.

First, in a transmitting side, transmitting signals that have been primary modulated (MOD-S) are parallel-converted to the number of subcarriers, that is, four subcarriers A to D by an S/P (Serial-Parallel) converter 11.

Transmitting signals of the respective subcarriers A to D are mapped by mapping circuits 12 to 15, the mapped signals are subjected to inverse fast Fourier transform by an IFFT circuit 16, and they are converted to analog signals by a D/A (Digital/Analog) converter 17. Then, the resultant signals (TR-S) are amplified; thereafter they are radio transmitted from a transmission antenna (not shown).

In addition, in a receiving side, signals (RE-S) received by a reception antenna (not shown) are converted to digital signals by an A/D (Analog/Digital) converter 51, and the converted digital signals are subjected to inverse fast Fourier transform by an FFT (Fast Fourier Transform) circuit 52.

The received signals of subcarriers A to D output from FFT circuits 52 are subjected to detection processing by detectors 53 to 56, respectively, and the resultant signals are demodulated by binary determination of determining units 57 to 60, and the modulated signals are converted to signals (DEM-S) of one channel by a P/S (Parallel-Serial) converter 61.

FIGS. 2A and 2B are views showing a spectrum of the conventional OFDM transmitting and receiving apparatus. FIG. 2A shows a signal spectrum at a signal transmitting time of a base station, and FIG. 2B shows a signal spectrum at a signal receiving time of a partner station. As shown in FIGS. 2A and 2B, an error in reception power occurs by subcarriers under a multipath environment even if transmission power remains constant.

In the conventional OFDM transmitting and receiving apparatus, since reception power does not remain constant, errors concentrate on subcarries wherein reception power has dropped, and this causes a problem in which an error rate characteristic is deteriorated.

DISCLOSURE OF INVENTION

It is an object of the present invention is to provide an OFDM transmitting and receiving apparatus and OFDM transmitting and receiving method wherein power between subcarriers can be maintained substantially constant at a receiving time so as to improve an error rate characteristic.

The above object can be achieved by performing such a signal transmission wherein a weight is assigned to power every subcarrier so that power between subcarriers becomes constant at a receiving time and transmission power is differentiated in OFDM transmission.

BEST MODE FOR CARRYING OUT THE INVENTION

Figure 1:
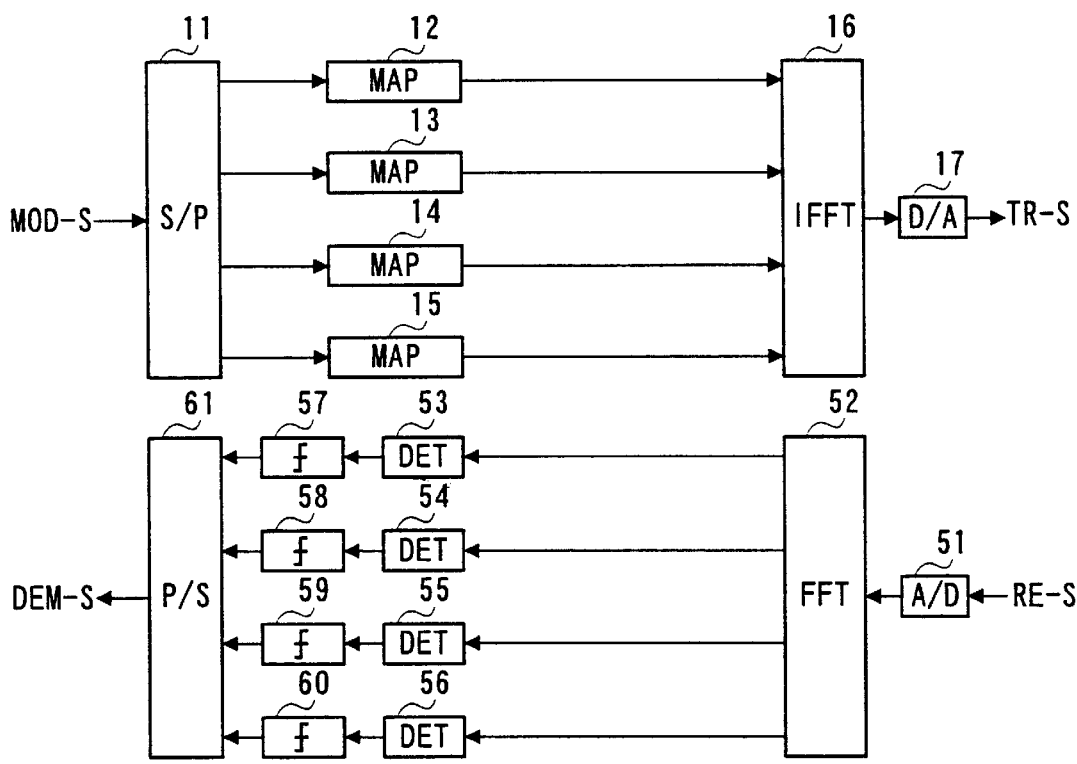
FIG. 1 is a block diagram showing a configuration of a conventional OFDM transmitting and receiving apparatus.
Figure 2A:
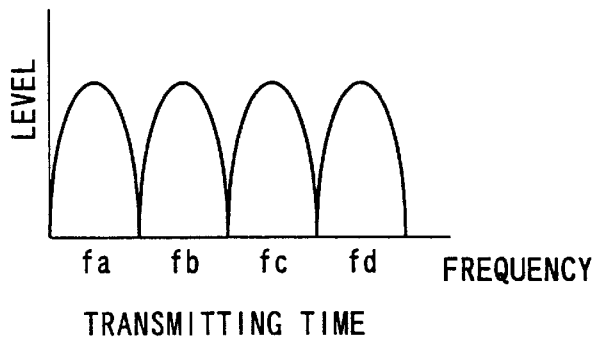
FIG. 2A is a view showing one example of a signal spectrum at a signal transmitting time relating to transmitting signals of the conventional OFDM transmitting and receiving apparatus.
Figure 2B:
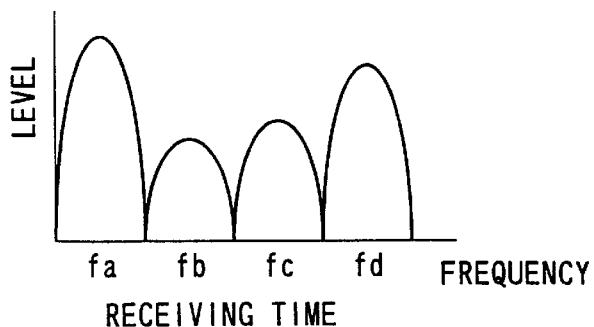
FIG. 2B is a view showing one example of a signal spectrum at a signal receiving time relating to transmitting signals of the conventional OFDM transmitting and receiving apparatus.

Embodiments of the present invention will be specifically explained with reference to the drawing accompanying herewith. It is assumed that the number of subcarriers is four in the explanation given below.

FIRST EMBODIMENT

Figure 3:
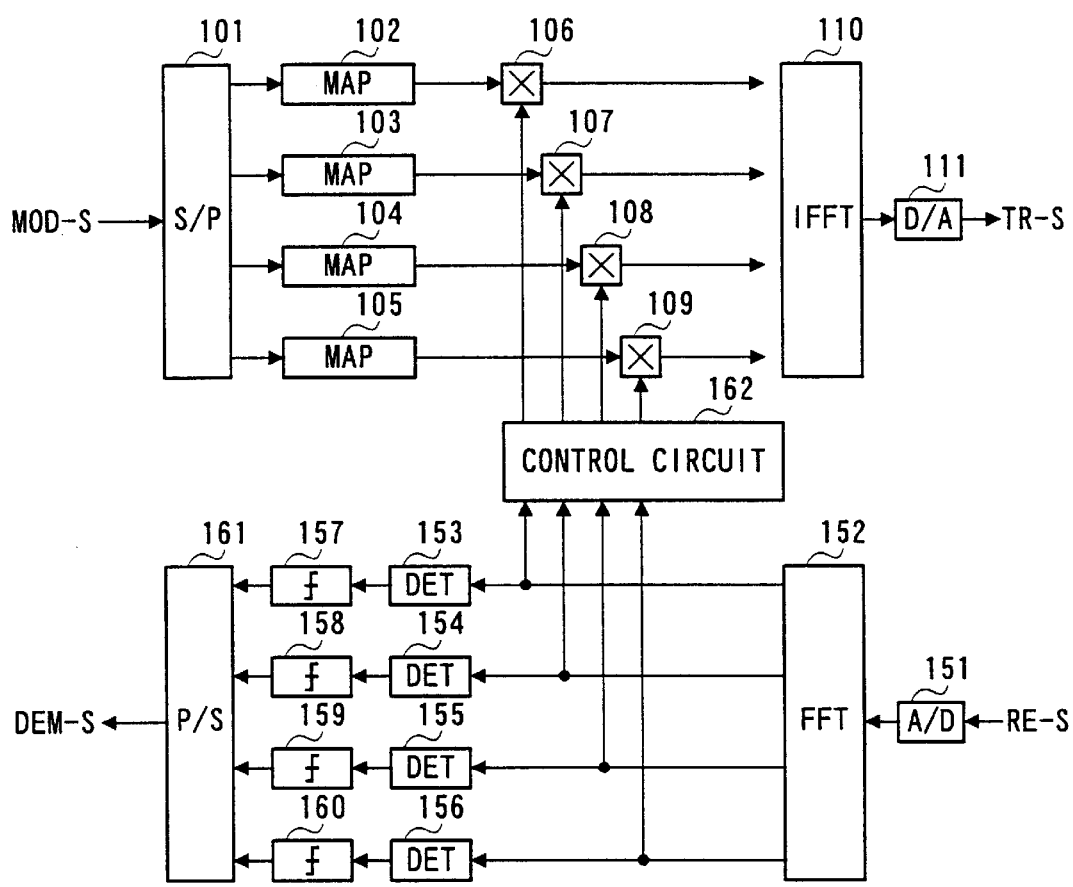
FIG. 3 is a block diagram showing a configuration of an OFDM transmitting and receiving apparatus according to a first embodiment of the present invention.

FIG. 3 is a block diagram showing a configuration of an OFDM transmitting and receiving apparatus according to a first embodiment of the present invention. In FIG. 3, an S/P (Serial-Parallel) converter 101 converts a primary modulated transmitting signal (MOD-S) of one channel to signals of a plurality of channels. In this embodiment, it is noted that signals of one channel are converted to signals of four channels.

Mapping circuits 102 to 105 map the signals of subcarriers A to D subjected to S/P conversion, respectively.

Multipliers 106 to 109 multiply the mapped signals of subcarriers A to D by signals of predetermined coefficients (hereinafter referred to as coefficient signals).

An IFFT (Inverse Fast Fourier Transform) circuit 110 provides inverse fast Fourier transform to transmitting signals output from the multipliers 106 to 109. A D/A (Digital/Analog) converter 111 D/A converts an output signal of the IFFT circuit 110 to output a transmitting signal (TR-S).

An A/D (analog/Digital) converter 151 provides A/D conversion to received signals (RE-S). An FFT (Fast Fourier Transform) circuit 152 provides inverse fast Fourier transform to the signals digitally converted.

Detectors 153 to 156 provide detection processing to the signals of subcarriers A to D output from the FFT circuit 152, respectively. Determination units 157 to 160 provide determination to the signals of subcarriers A to D subjected to detection processing to demodulate these signals.

A P/S (Paralle-Serial) converter 161 converts the demodulated signals (DEM-S) of the plurality of channels to the signals of one channel. In this embodiment, the signals of four channels are converted to the signals of one channel.

A control circuit 162 calculates a coefficient by which the transmitting signals of the respective subcarriers are multiplied, and the calculated coefficient signal is output to multipliers 106 to 109 based on the output signal of the FFT circuit 152.

Figure 4:
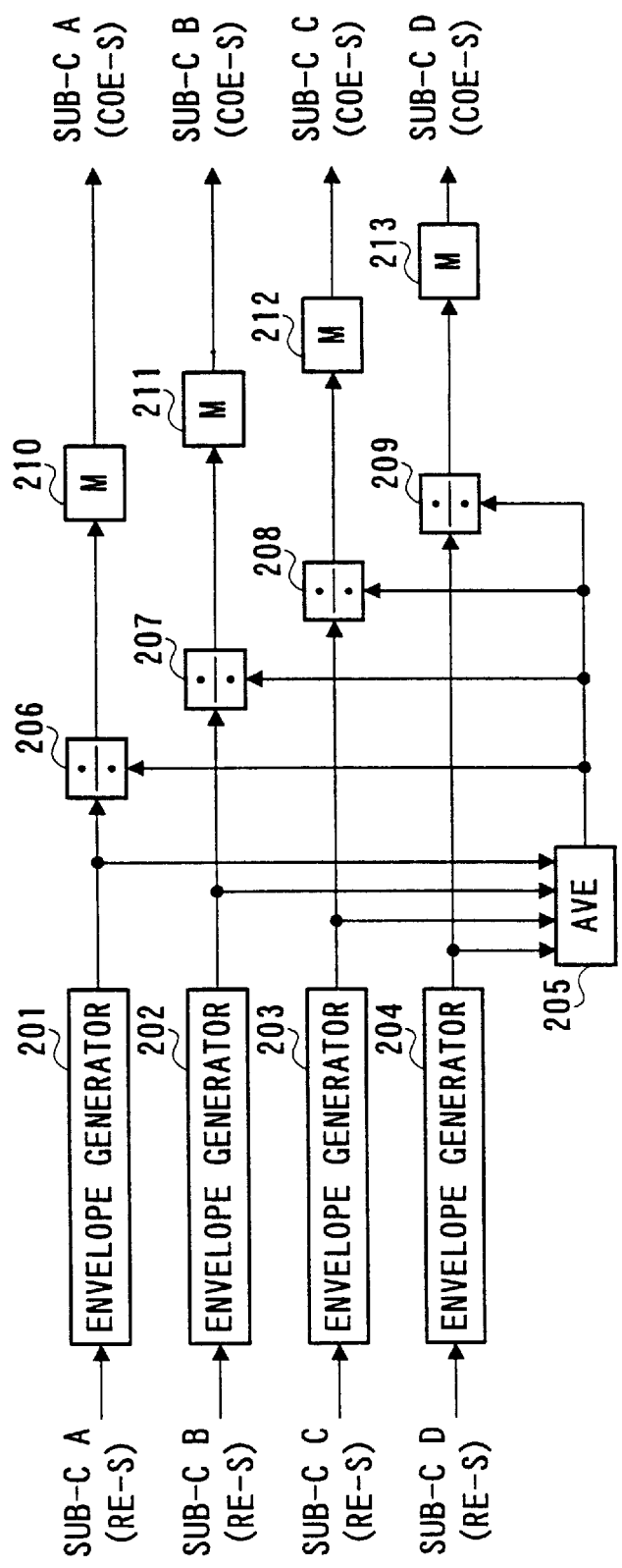
FIG. 4 is a block diagram showing a configuration of the periphery of a control circuit of the OFDM transmitting and receiving apparatus according to the first embodiment of the present invention.

Next, the following will explain a detailed configuration of the control circuit 162 with reference to the block diagram of FIG. 4.

In FIG. 4, envelope generators 201 to 204 generate envelopes of the received signals of subcarriers (SUB-C) A to D output from the FFT circuit 152. An averaging circuit 205 calculates an average of output signals of the envelope generators 201 to 204.

Dividers 206 to 209 divides the average value output from the averaging circuit 205 by the output signal of each of the envelope generators 201 to 204 so as to calculate each of the coefficient signals of the subcarriers. Memories 210 to 213 temporarily store the coefficient signals (COE-S) output from the dividers 206 to 209, and output them to the multipliers 106 to 109, respectively.

Next, an explanation of signal processing of the OFDM transmitting and receiving apparatus according to the first embodiment will be given with reference to FIGS. 3 and 4.

In the transmitting side, the S/P converter 101 parallel converts the transmitting signals, which have been primary modulated, to the number of subcarriers, that is, four subcarriers A to D.

The transmitting signals of subcarriers A to D are mapped by the mapping circuits 102 to 105, respectively, and the mapped signals are multiplied by the coefficient signals by the multipliers 106 to 109, and the resultant signals are output to the IFFT converter 110.

The respective signals input to the IFFT converter 110 are subjected to inverse fast Fourier transform, and the resultant signals are converted to analog signals by the D/A converter 111. Then, the converted signals are amplified; thereafter they are radio transmitted from the antenna.

In the receiving side, the received signals are converted to digital signals by the A/D converter 151, and the digital signals are subjected to inverse fast Fourier transform by the FFT converter 152.

The received signals of subcarriers A to D output from the FFT converter 152 are subjected to detection processing by the detectors 153 to 156, and the resultant signals are demodulated by binary determination of determining units 157 to 160, and the demodulated signals are converted to signals of one channel by the P/S converter 161.

In the control circuit 162, the envelope generators 201 to 204 generate envelopes of the received signals of subcarriers A to D output from the FFT circuit 152. The averaging circuit 205 calculates an average of the output signals of the envelope generators 201 to 204.

Then, the dividers 206 to 209 divide the output signal of each of the envelope generators 201 to 204 by the average value to calculate each of the coefficient signals by which the transmitting signals are multiplied. The calculated coefficient signals of subcarriers A to D are temporarily stored in the memories 210 to 213, thereafter they are output to the multipliers 106 to 109.

Figure 5A:
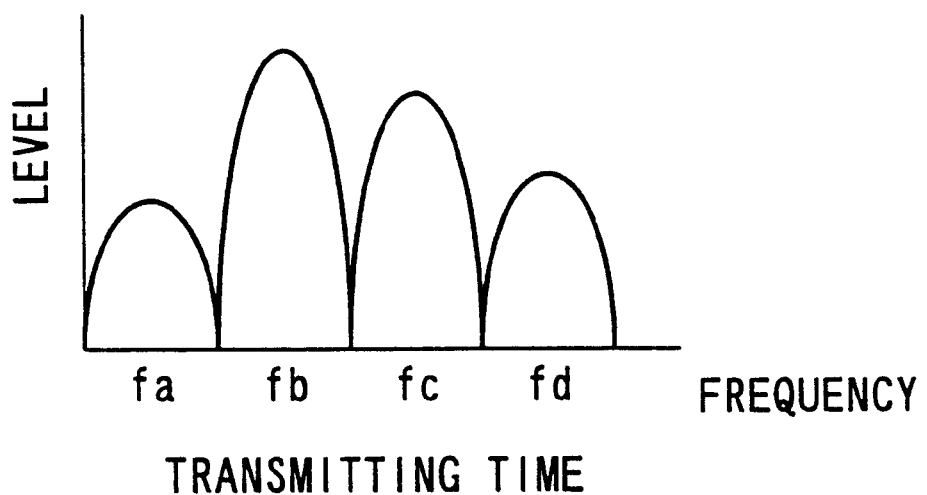
FIG. 5A is a view showing one example of a signal spectrum at a signal transmitting time in transmitting signals of the OFDM transmitting and receiving apparatus according to the first embodiment.
Figure 5B:
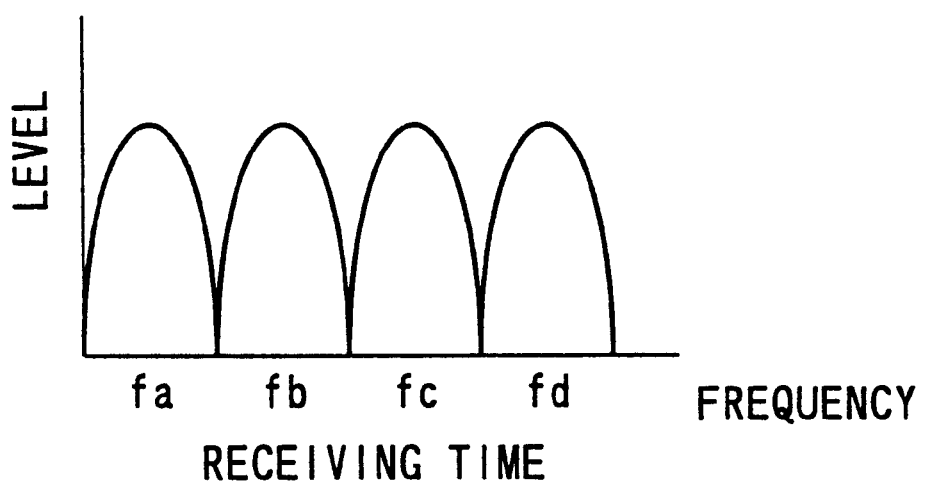
FIG. 5B is a view showing one example of a signal spectrum at a signal receiving time in transmitting signals of the OFDM transmitting and receiving apparatus according to the first embodiment.

FIGS. 5A and 5B are views showing one example of a spectrum of the signal transmitted from the OFDM transmitting and receiving apparatus according to the first embodiment. FIG. 5A shows a signal spectrum at a signal transmitting time of the base station, and FIG. 5B shows a signal spectrum at a signal receiving time of a partner station.

As shown in FIGS. 5A and 5B, if a multipath environment is estimated from power of the received signals from the partner station and a weight is assigned to transmission power every subcarrier, thereafter the signals are transmitted, power can be made substantially constant at the time when the signals are received by the partner station.

Thus, the weight is assigned to transmission power every subcarrier such that power can be maintained substantially constant at the time when the signals are received by the partner station based on power of the received signals from the partner station. This makes it possible to improve an error rate characteristic.

Particularly, the present apparatus is used in the base station apparatus, and transmission power control is performed. This makes it possible to improve an error rate characteristic of a forward link without increasing a hardware scale of a communication terminal apparatus.

SECOND EMBODIMENT

Figure 6:
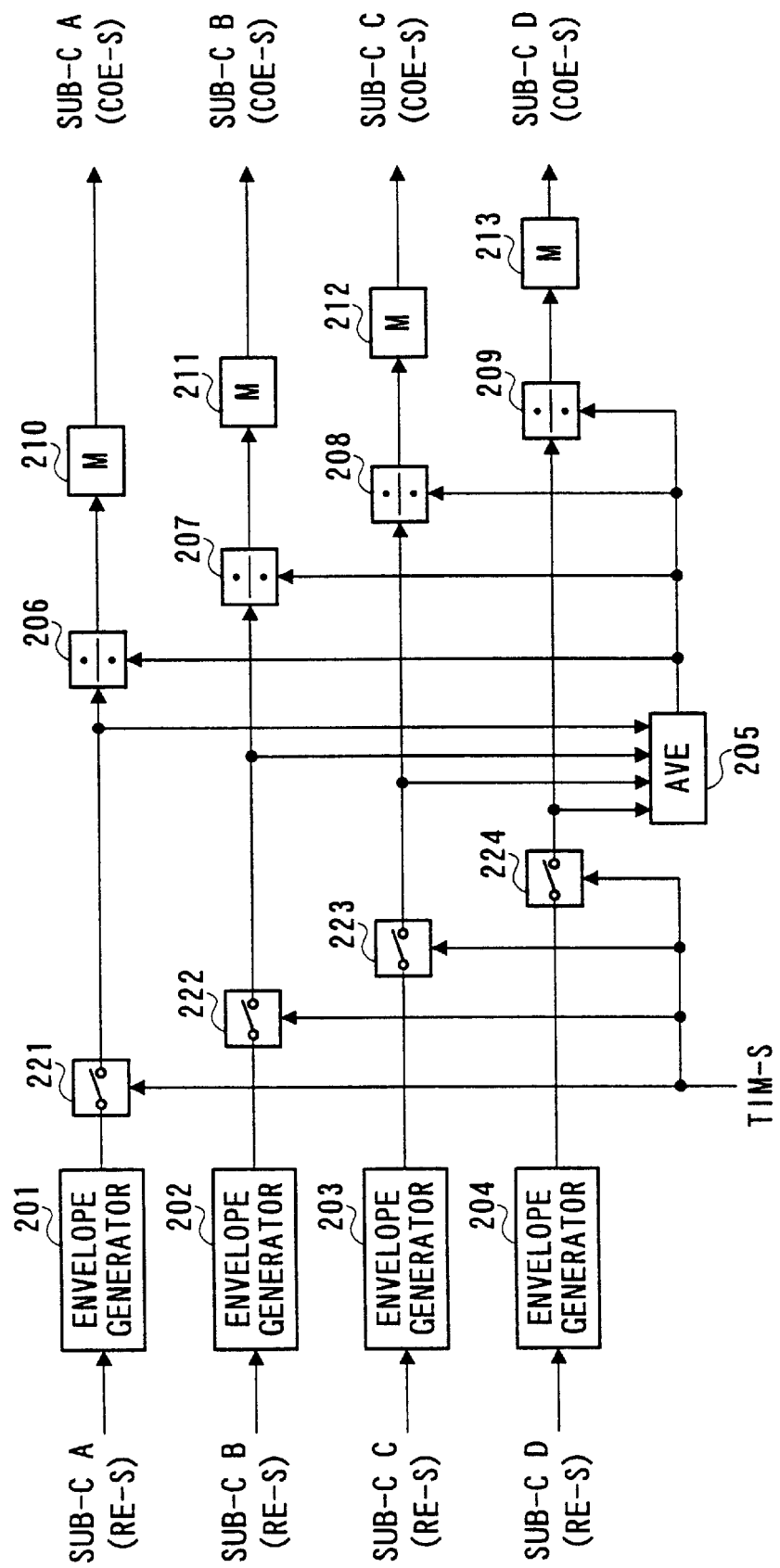
FIG. 6 is a block diagram showing a configuration of the periphery of a control circuit of the OFDM transmitting and receiving apparatus according to a second embodiment of the present invention.

FIG. 6 is a block diagram showing a configuration of the periphery of the control circuit 162 of the OFDM transmitting and receiving apparatus according to the second embodiment of the present invention. In the OFDM transmitting and receiving apparatus shown in FIG. 6, the same reference numerals as those of FIG. 4 are added to the portions common to the OFDM transmitting and receiving apparatus of FIG. 4, and the explanation is omitted.

The OFDM transmitting and receiving apparatus of FIG. 6 adopts a configuration in which connection switches 221 to 224 are added to the control circuit 162 as compared with the OFDM transmitting and receiving apparatus of FIG. 4.

The envelope generators 201 to 204 output the generated envelopes to the connection switches 221 to 224. The connection switches 221 to 224 output only final symbols of the signals of subcarriers A to D, which have been output from the envelope generators 201 to 204, to the averaging circuit 205 and the dividers 206 to 209 based on a timing signal.

The averaging circuit 205 calculates average value of power in the final symbols of the received signals. The dividers 206 to 209 divide the average value of power in the final symbols of the received signals output from the averaging circuit 205 by power of the signals in the final symbols of the received signals, whereby calculating the coefficient signals of the respective subcarriers.

Thus, the calculation of the coefficient signals of subcarriers using power of the final symbols of the received signals makes it possible to reduce an error caused by variations in the link, and to further improve the error rate as compared with the first embodiment.

THIRD EMBODIMENT

Figure 7:
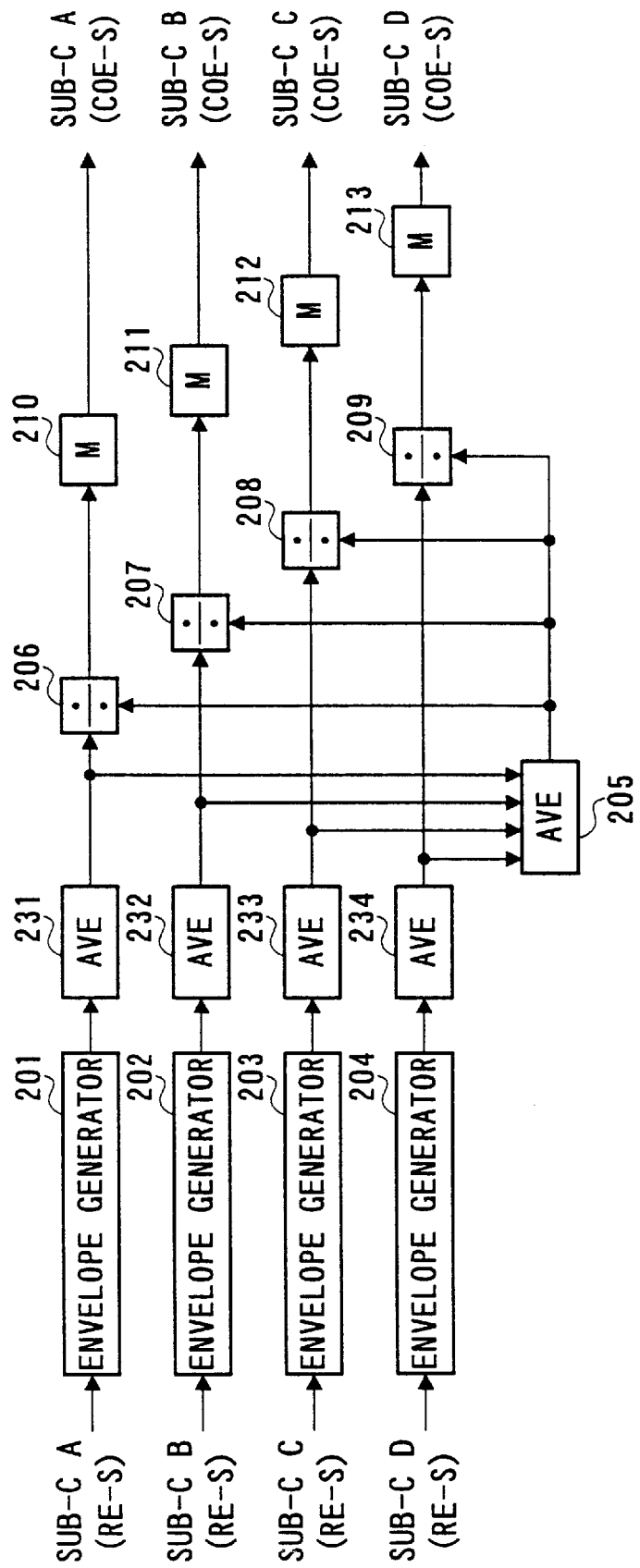
FIG. 7 is a block diagram showing a configuration of the periphery of a control circuit of the OFDM transmitting and receiving apparatus according to a third embodiment of the present invention.

FIG. 7 is a block diagram showing a configuration of the periphery of the control circuit 162 of the OFDM transmitting and receiving apparatus according to the third embodiment of the present invention. In the OFDM transmitting and receiving apparatus shown in FIG. 7, the same reference numerals as those of FIG. 4 are added to the portions common to the OFDM transmitting and receiving apparatus of FIG. 4, and the explanation is omitted.

The OFDM transmitting and receiving apparatus of FIG. 7 adopts a configuration in which averaging circuits 231 to 234 are added to the control circuit 162 as compared with the OFDM transmitting and receiving apparatus of FIG. 4.

The envelope generator 201 to 204 output the generated envelopes to the averaging circuit 231 to 234. The averaging circuits 231 to 234 calculate the average value of the signals of subcarriers A to D output from the envelope generators 201 to 204 based on a timing signal, and output them to the averaging circuit 205 and dividers 206 to 209.

The averaging circuit 205 averages the values of the averaging circuits 231 to 234. The dividers 206 to 209 divide the average value of power in the final symbols of the received signals, which have been output from the averaging circuit 205, by power of the signals output from the averaging circuits 231 to 234, whereby calculating the coefficient signals of the respective subcarriers.

Thus, the calculation of the coefficient signals of subcarriers using the average value of power of the received signals makes it possible to reduce deterioration in accuracy caused by influence of noise, and to further improve the error rate as compared with the first and second embodiments.

FOURTH EMBODIMENT

Figure 8:
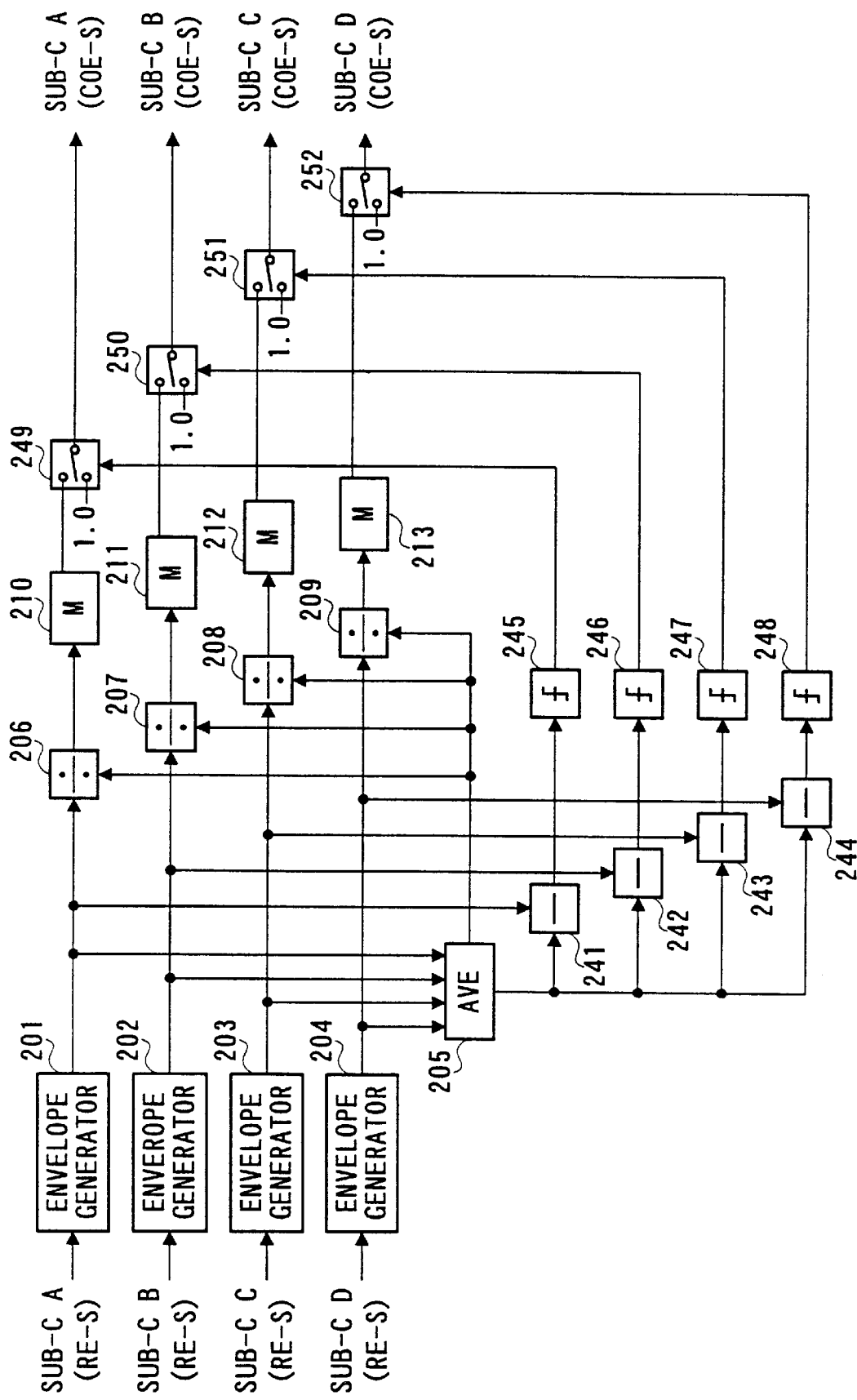
FIG. 8 is a block diagram showing a configuration of the periphery of a control circuit of the OFDM transmitting and receiving apparatus according to a fourth embodiment of the present invention.

FIG. 8 is a block diagram showing a configuration of the periphery of the control circuit 162 of the OFDM transmitting and receiving apparatus according to the fourth embodiment of the present invention. In the OFDM transmitting and receiving apparatus shown in FIG. 8, the same reference numerals as those of FIG. 4 are added to the portions common to the OFDM transmitting and receiving apparatus of FIG. 4, and the explanation is omitted.

The OFDM transmitting and receiving apparatus of FIG. 8 adopts a configuration in which digital subtracters 241 to 244, determination units 245 to 248, and selector switches 249 to 252 are added to the control circuit 162 as compared with the OFDM transmitting and receiving apparatus of FIG. 4.

The averaging circuit 205 outputs the calculated average value to the dividers 206 to 208 and the digital subtractors 241 to 244. The digital subtractors 241 to 244 subtract the output signal of the averaging circuit 205 from the output signals of the envelope generators 201 to 204, and output the subtraction result to the determination units 245 to 248, respectively.

In a case where codes of the digital subtracters 241 to 244 are negative, that is, the reception power is below the average value, the determination units 245 to 248 output coefficient signals stored in the memories 210 to 213 to the multipliers 106 to 109, respectively. In other cases, the determination units 245 to 248 control the selector switches 249 to 252 to output a coefficient "1.0" to the multipliers 106 to 109.

Thus, only the transmitting signal of subcarrier wherein reception power is below the average value is multiplied by the coefficient, thereby making it possible to further improve the error rate as compared with the first embodiment.

For reference sake, the fourth embodiment can be combined with the second or third embodiment.

FIFTH EMBODIMENT

Figure 9:
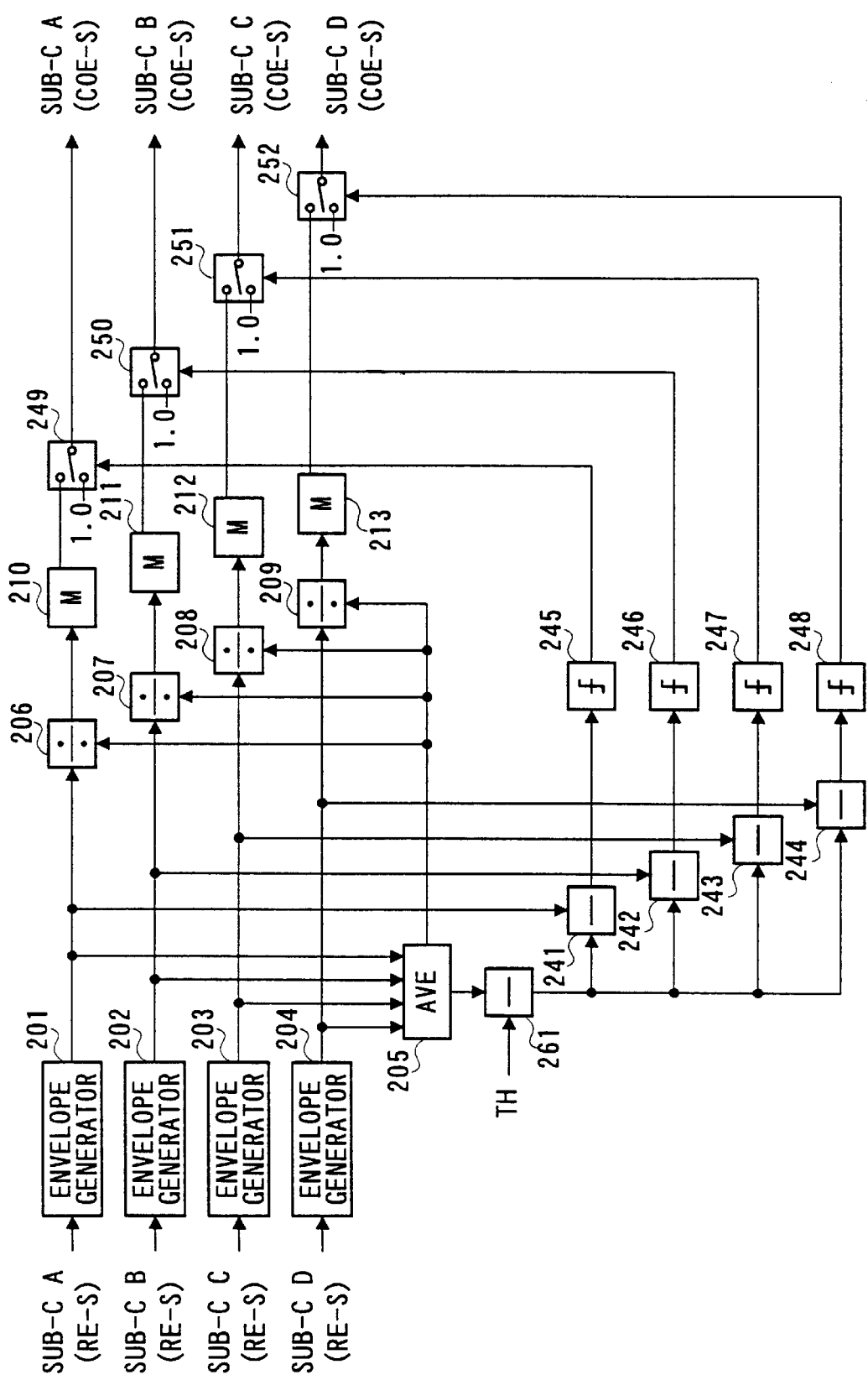
FIG. 9 is a block diagram showing a configuration of the periphery of a control circuit of the OFDM transmitting and receiving apparatus according to a fifth embodiment of the present invention.

FIG. 9 is a block diagram showing a configuration of the periphery of the control circuit 162 of the OFDM transmitting and receiving apparatus according to the fifth embodiment of the present invention. In the OFDM transmitting and receiving apparatus shown in FIG. 9, the same reference numerals as those of FIG. 8 are added to the portions common to the OFDM transmitting and receiving apparatus of FIG. 8, and the explanation is omitted.

The OFDM transmitting and receiving apparatus of FIG. 9 adopts a configuration in which a threshold value (TH) is set in the control circuit 162 and a digital subtracter 261 is added as compared with the OFDM transmitting and receiving apparatus of FIG. 8.

The averaging circuit 205 outputs the calculated average value to the dividers 206 to 209 and the subtracter 261. The subtracter 261 subtracts a preset threshold value from the output signal of the averaging circuit 205, and outputs the subtraction result to the digital subtracters 241 to 244. The digital subtracters 241 to 244 subtract the output signal of the subtracter 261 from the envelope generators 201 to 204, and output the subtraction result to the determination units 245 to 248, respectively.

Thus, the threshold value is preset, and the transmitting signal of subcarrier wherein reception power is way below the value obtained by subtracting the threshold value from the average value is multiplied by the coefficient. Whereby making it possible to deal with the case in which standard of transmission power is strict and power of the entire apparatus must be reduced.

For reference sake, the fifth embodiment can be combined with the second or third embodiment.

SIXTH EMBODIMENT

Figure 10:
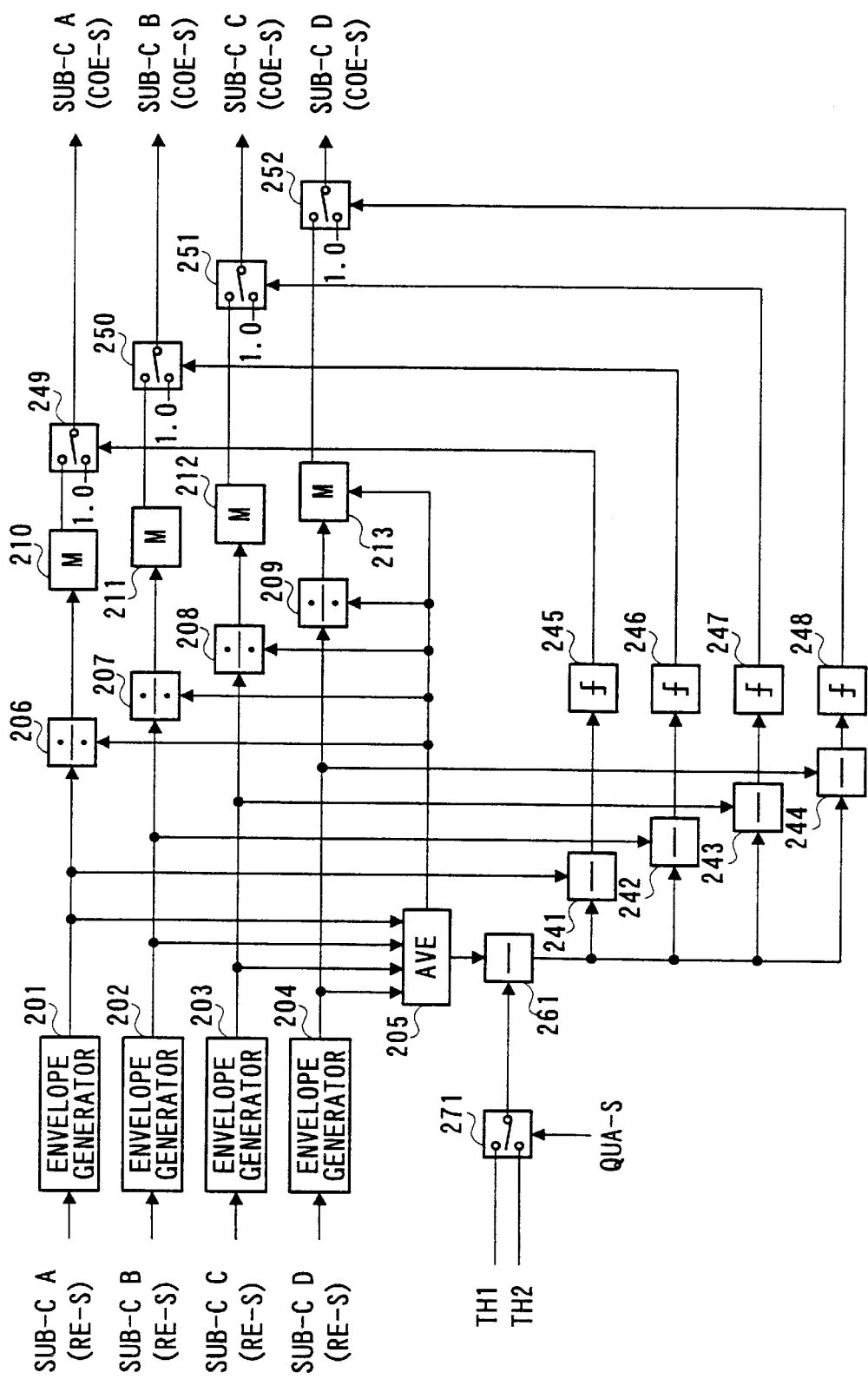
FIG. 10 is a block diagram showing a configuration of the periphery of a control circuit of the OFDM transmitting and receiving apparatus according to a sixth embodiment of the present invention.

FIG.10 is a block diagram showing a configuration of the periphery of the control circuit 162 of the OFDM transmitting and receiving apparatus according to the sixth embodiment of the present invention. In the OFDM transmitting and receiving apparatus shown in FIG. 10, the same reference numerals as those of FIG. 9 are added to the portions common to the OFDM transmitting and receiving apparatus of FIG. 9, and the explanation is omitted.

The OFDM transmitting and receiving apparatus of FIG. 10 adopts a configuration in which a threshold value 1, which is used when a link quality is good, is set and a threshold value 2, which is used when the link quality is poor, is set in the control circuit 162, and a selector switch 271 is added as compared with the OFDM transmitting and receiving apparatus of FIG. 9.

The selector switch 271 outputs threshold value 1 to the subtracter 261 when the link quality is good and threshold value 2 thereto when the link quality is poor based on a link quality signal (QUA-S). The subtracter 261 subtracts threshold 1 or 2 from the output signal of the averaging circuit 205, and outputs the subtraction result to the digital subtracters 241 to 244.

Thus, the threshold value for use in determining whether or not the coefficient signal is multiplied is appropriately changed based on the link quality, and this makes it possible to more improve the error rate characteristic than the fifth embodiment.

For reference sake, the sixth embodiment can be combined with the second or third embodiment.

SEVENTH EMBODIMENT

Figure 11:
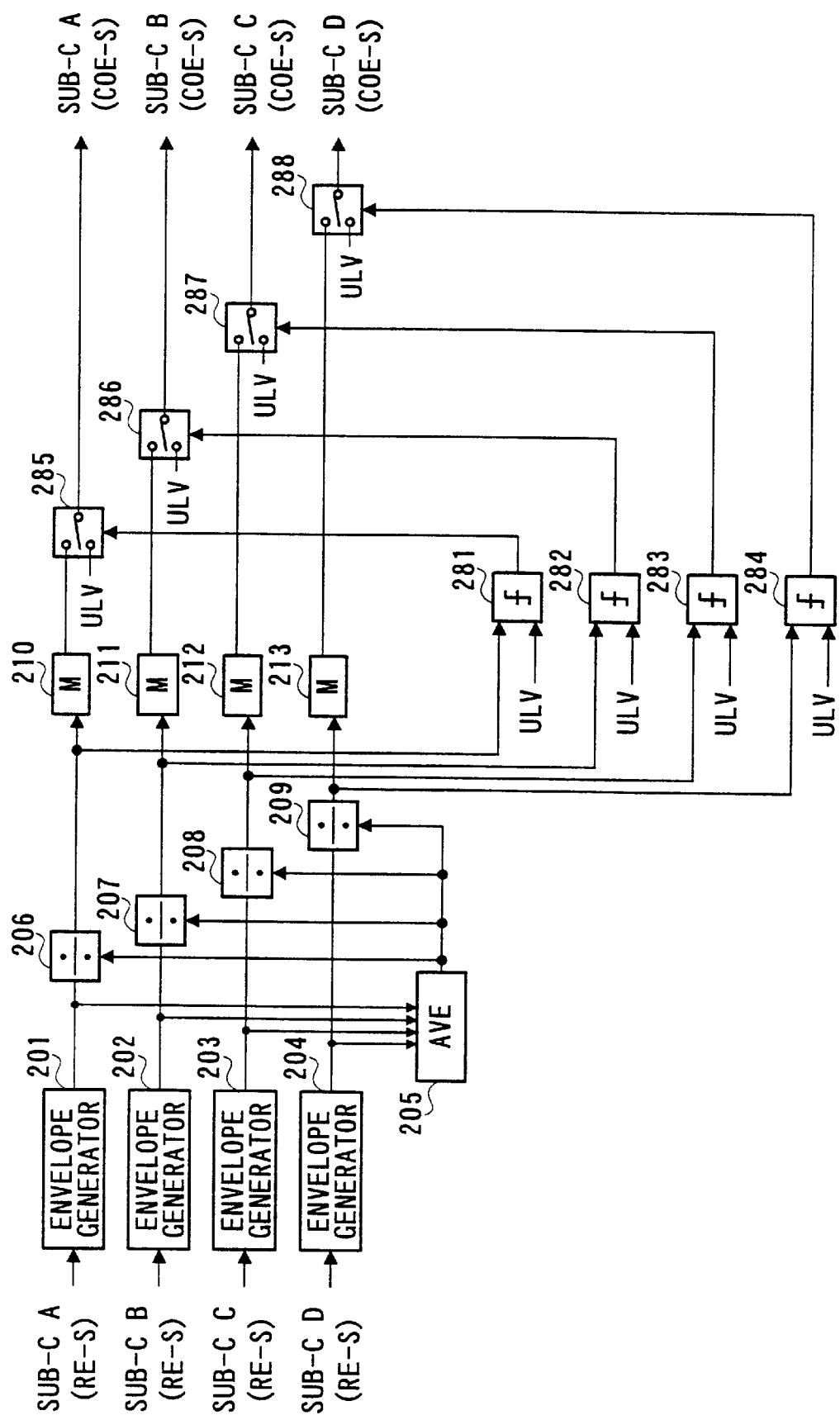
FIG. 11 is a block diagram showing a configuration of the periphery of a control circuit of the OFDM transmitting and receiving apparatus according to a seventh embodiment of the present invention.

FIG. 11 is a block diagram showing a configuration of the periphery of the control circuit 162 of the OFDM transmitting and receiving apparatus according to the seventh embodiment of the present invention. In the OFDM transmitting and receiving apparatus shown in FIG. 11, the same reference numerals as those of FIG. 4 are added to the portions common to the OFDM transmitting and receiving apparatus of FIG. 4, and the explanation is omitted.

The OFDM transmitting and receiving apparatus of FIG. 11 adopts a configuration in which determination units 281 to 284 and selector switches 285 to 288 are added to the control circuit 162 as compared with the OFDM transmitting and receiving apparatus of FIG. 4.

The dividers 206 to 209 output the calculated coefficient signals of subcarriers to the memories 210 to 213 and determination units 281 to 284.

When the coefficient signals of subcarriers are below a predetermined upper limit value (ULV: for example, "2.0"), the determination units 281 to 284 output the coefficient signals stored in the memories 210 to 213 to the multipliers 106 to 109. When the coefficient signals of subcarriers exceed the predetermined upper limit value, they control the selector switches 285 to 288 such that the upper limit value is output to the multipliers 106 to 109.

Thus, the upper limit is provided to the coefficient by which the transmitting signals of subcarriers are multiplied. Whereby, peak power can be suppressed and the capacity of transmission amplifier can be controlled.

EIGHTH EMBODIMENT

Figure 12:
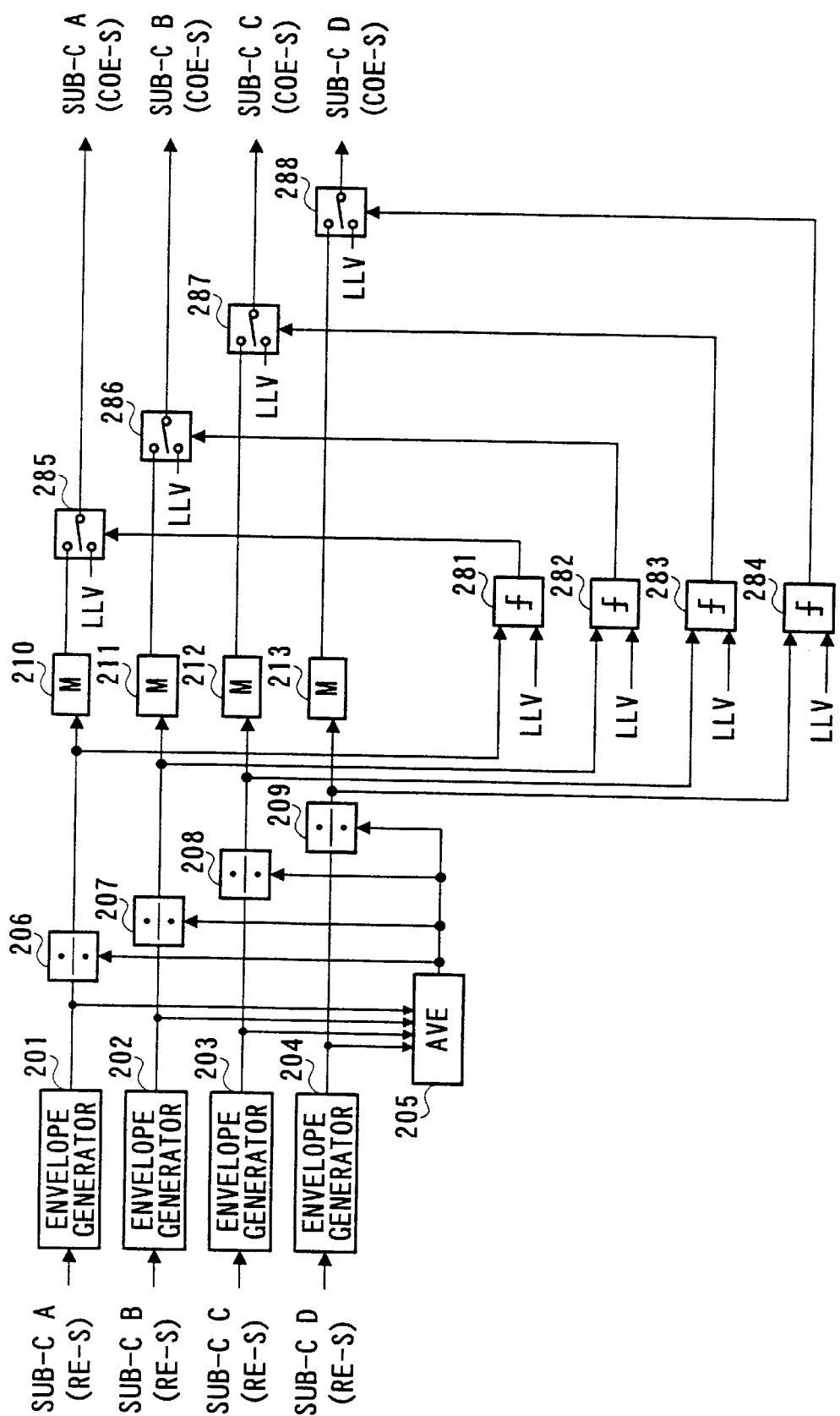
FIG. 12 is a block diagram showing a configuration of the periphery of a control circuit of the OFDM transmitting and receiving apparatus according to an eighth embodiment of the present invention.

FIG. 12 is a block diagram showing a configuration of the periphery of the control circuit 162 of the OFDM transmitting and receiving apparatus according to the eighth embodiment of the present invention. In the OFDM transmitting and receiving apparatus shown in FIG. 12, the same reference numerals as those of FIG. 4 are added to the portions common to the OFDM transmitting and receiving apparatus of FIG. 4, and the explanation is omitted.

The OFDM transmitting and receiving apparatus of FIG. 12 adopts a configuration in which determination units 281 to 284 and selector switches 285 to 288 are added to the control circuit 162 as compared with the OFDM transmitting and receiving apparatus of FIG. 4.

The dividers 206 to 209 output the calculated coefficient signals of subcarriers to the memories 210 to 213 and determination units 281 to 284.

When the coefficient signals of subcarriers are below a predetermined lower limit value (LLV: for example, "0.2"), the determination units 281 to 284 output the coefficient signals stored in the memories 210 to 213 to the multipliers 106 to 109. When the coefficient signals of subcarriers are below the predetermined lower limit value, they controls the selector switches 285 to 288 such that the lower limit value is output to the multipliers 106 to 109.

Thus, the lower limit is provided to the coefficient by which the transmitting signals of subcarriers are multiplied. This makes it possible to prevent the level difference between the subcarriers to be increased by performing gain control when a time interval between the reverse link and the forward link is large.

For reference sake, the eighth embodiment can be combined with any one of the second to seventh embodiments.

NINTH EMBODIMENT

Figure 13:
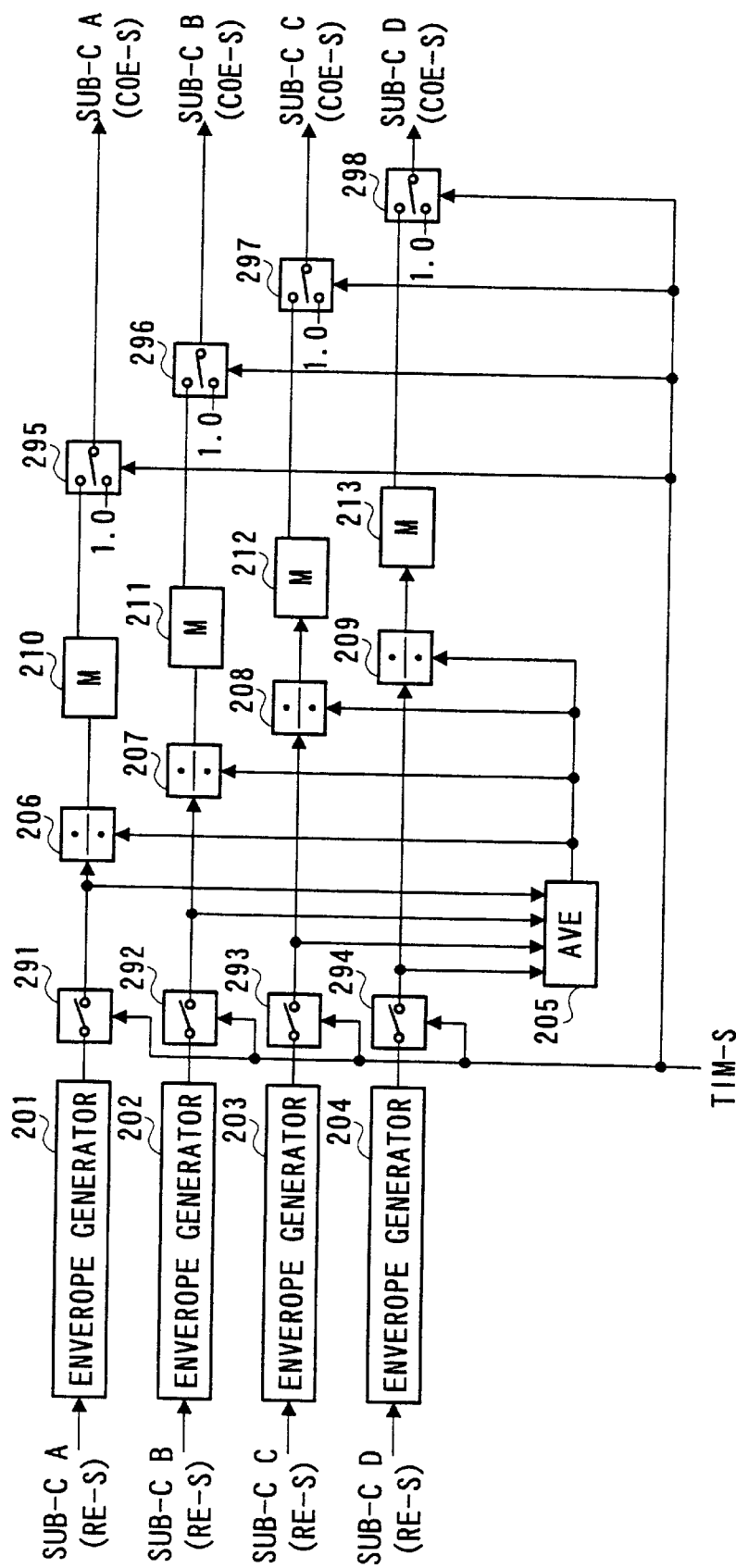
FIG. 13 is a block diagram showing a configuration of the periphery of a control circuit of the OFDM transmitting and receiving apparatus according to a ninth first embodiment of the present invention.

FIG. 13 is a block diagram showing a configuration of the periphery of the control circuit 162 of the OFDM transmitting and receiving apparatus according to the ninth embodiment of the present invention. In the OFDM transmitting and receiving apparatus shown in FIG. 13, the same reference numerals as those of FIG. 4 are added to the portions common to the OFDM transmitting and receiving apparatus of FIG. 4, and the explanation is omitted.

The OFDM transmitting and receiving apparatus of FIG. 13 adopts a configuration in which connection switches 291 to 294 and selector switches 295 to 298 are added to the control circuit 162 as compared with the OFDM transmitting and receiving apparatus of FIG. 4.

The envelope generators 201 to 204 output the generated envelopes to the connection switches 291 to 294. The connection switches 291 to 294 output the signals of subcarriers A to D, which have been output from the envelope generators 201 to 204, to the averaging circuit 205 and dividers 206 to 209 based on the timing signal only in a case where packets each having important information is mounted thereon are transmitted.

In a case where packets each having important information is mounted thereon are transmitted, the selector switches 295 to 298 output the coefficient signals stored in the memories 210 to 213 to the multipliers 106 to 109 based on the timing signal. In other cases, they output the coefficient "1.0" to the multipliers 106 to 109.

Thus, gain control to multiply the transmitting signals of subcarriers by the efficient is performed only when packets each having important information is mounted thereon are transmitted. Whereby, for example, even in a frame format wherein the forward link is placed in the first half of the frame and the reverse link is placed in the second half, there is no need to reserve the coefficients corresponding to the number of users, and the memory capacity can be suppressed. This makes it possible to improve the error rate characteristic of important information without increasing the hardware scale. Then, the memories can be shared with the demodulation circuit if the number of coefficients to be reserved is equivalent to one user at the maximum.

For reference sake, the ninth embodiment may be appropriately combined with any one of the second to eighth embodiments.

TENTH EMBODIMENT

Figure 14:
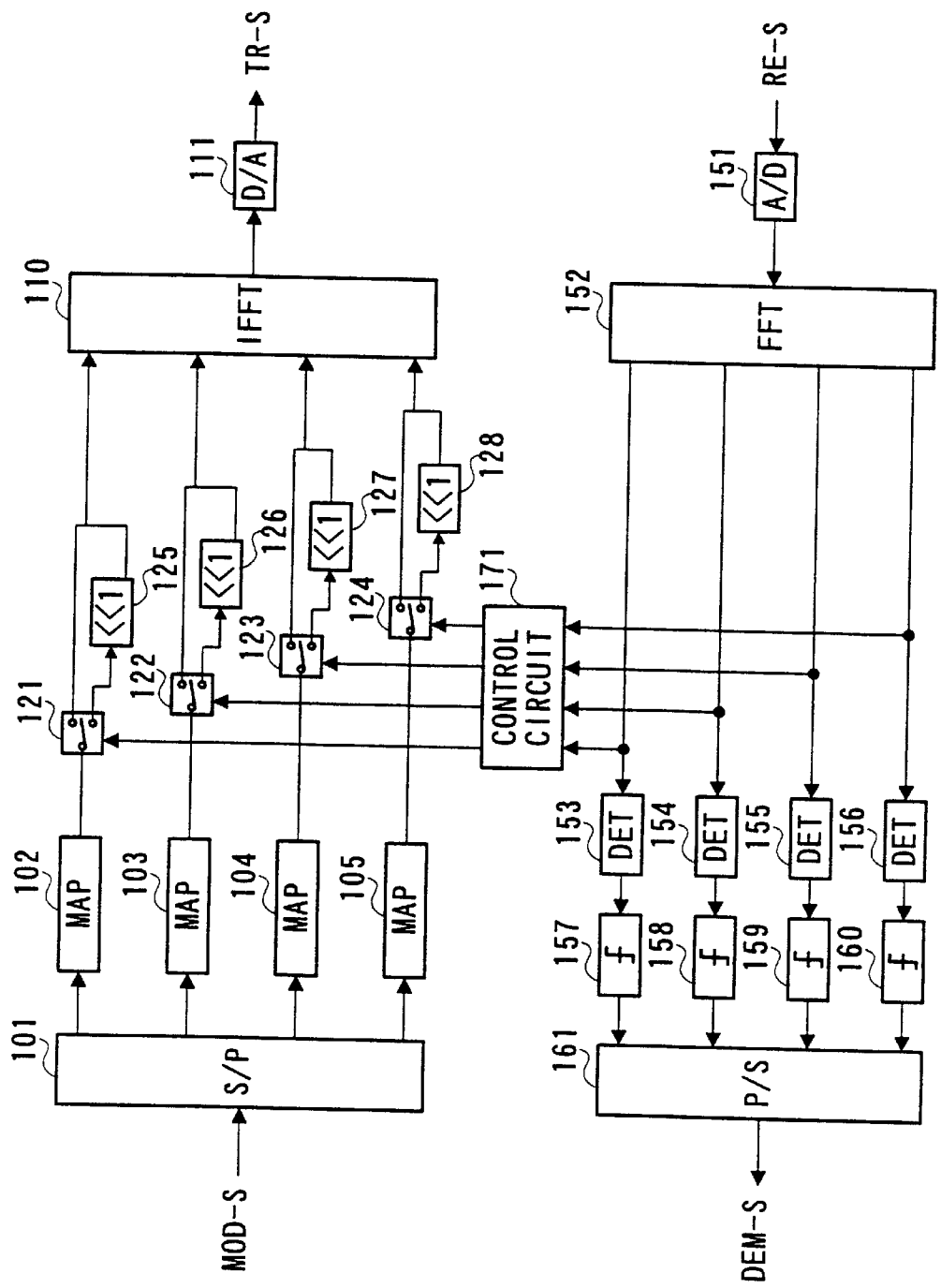
FIG. 14 is a block diagram showing a configuration of the OFDM transmitting and receiving apparatus according to a tenth embodiment.

FIG. 14 is a block diagram showing a configuration of the OFDM transmitting and receiving apparatus according to the tenth embodiment of the present invention. In the OFDM transmitting and receiving apparatus shown in FIG. 14, the same reference numerals as those of FIG. 3 are added to the portions common to the OFDM transmitting and receiving apparatus of FIG. 3, and the explanation is omitted.

As compared with the OFDM transmitting and receiving apparatus of FIG. 3, the OFDM transmitting and receiving apparatus of FIG. 14 adopts a configuration in which selector switches 121 to 124 in place of the multipliers 106 to 109 and one bit shift circuits 125 to 128 for doubling amplitude are used. In addition, the OFDM transmitting and receiving apparatus of FIG. 14 adopts a configuration in which a control circuit 171 for outputting a control signal is used in place of the control circuit 162 for outputting the coefficient signal.

Figure 15:
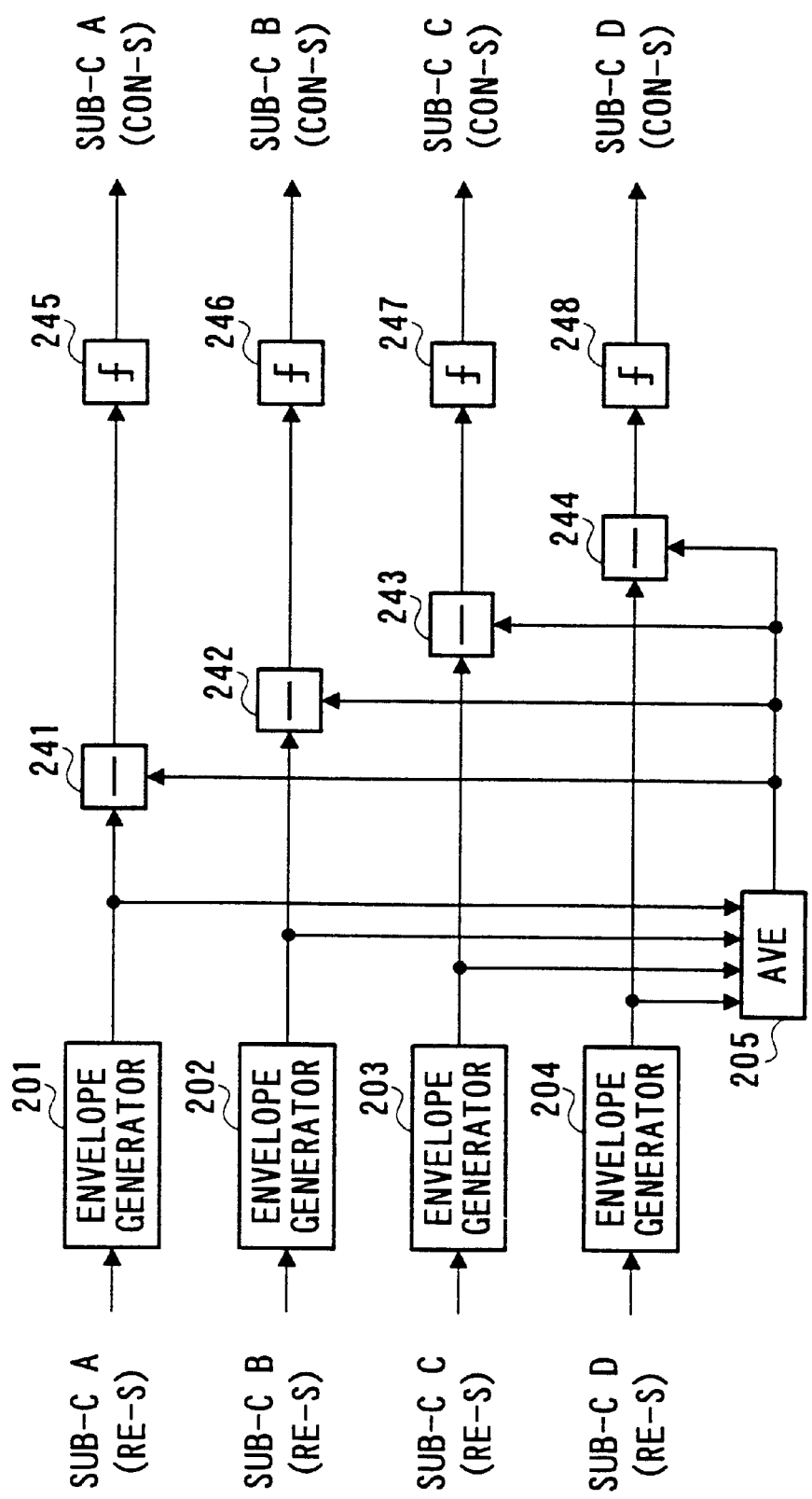
FIG. 15 is a block diagram showing a configuration of the periphery of a control circuit of the OFDM transmitting and receiving apparatus according to the tenth embodiment of the present invention.

FIG. 15 is a block diagram showing a configuration of the periphery of the control circuit 171 of the OFDM transmitting and receiving apparatus according to the tenth embodiment of the present invention. In the control circuit 171 of the OFDM transmitting and receiving apparatus shown in FIG. 15, the same reference numerals as those of FIG. 8 are added to the portions common to the control circuit 162 of the OFDM transmitting and receiving apparatus of FIG. 8, and the explanation is omitted.

As compared with the control circuit 162 of the OFDM transmitting and receiving apparatus of FIG. 8, the control circuit 171 of the OFDM transmitting and receiving apparatus shown in FIG. 15 adopts a configuration in which the dividers 206 to 209, memories 210 to 213, and selector switches 249 to 252 are deleted, and the control signals of the determination units 245 to 248 are output. In a case where the codes of the digital subtracters 241 to 244 are negative, that is, reception power is below the average value, the control circuit 171 outputs the output signals of the mapping circuits 102 to 105 to the one bit shift circuits 125 to 128. In other cases, the control circuit 171 controls selector switches 121 to 124 such that the output signals of the mapping circuits 102 to 105 are directly output to the IFFT circuit 110.

Thus, amplitude is changed by the bit shift circuits and adder-subtracters without using the multipliers, so that the circuit scale can be reduced. A plurality of magnification of amplitude, such as "2.0", "1.5", "1.25", and the like, which can be implemented by combining the bit shift circuits and the adder-subtracters, is prepared. The magnification of amplitude is switched and controlled based on reception power of each subcarrier in order to select magnification appropriately, whereby making it possible to perform precise transmission power control.

For reference sake, the tenth embodiment can be combined with the second or third embodiment. In addition, as in the fifth embodiment, the subtracter 261 is added to subtract a predetermined threshold value from the output signal of the averaging circuit 205. Then, by use of the obtained value, the determination may be performed. Moreover, as in the sixth embodiment, the selector switch 271 is added so that the threshold value for use in the determination may be appropriately changed.

ELEVENTH EMBODIMENT

Figure 16:
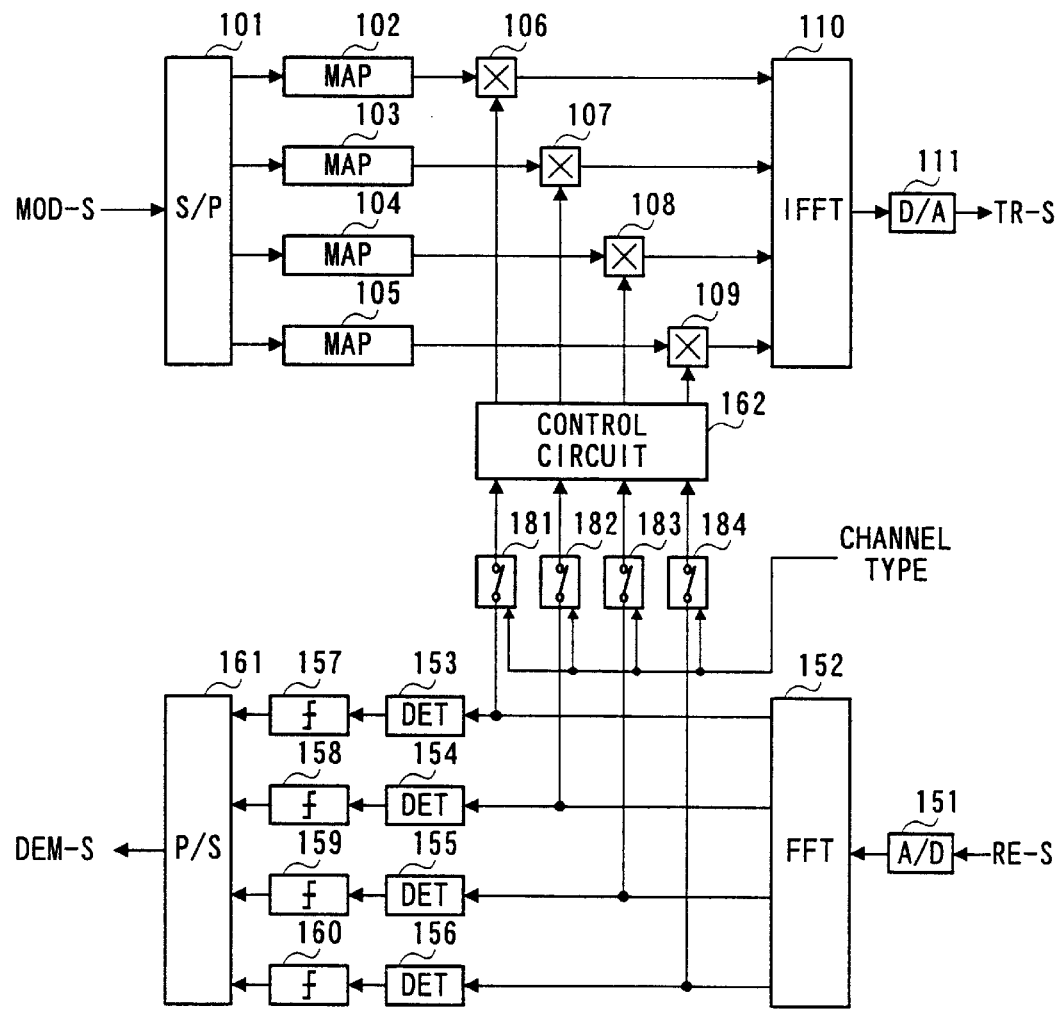
FIG. 16 is a block diagram showing a configuration of the OFDM transmitting and receiving apparatus according to an eleventh embodiment.

FIG. 16 is a block diagram showing a configuration of the OFDM transmitting and receiving apparatus according to the eleventh embodiment of the present invention. In the OFDM transmitting and receiving apparatus shown in FIG. 16, the same reference numerals as those of FIG. 3 are added to the portions common to the OFDM transmitting and receiving apparatus of FIG. 3, and the explanation is omitted.

The OFDM transmitting and receiving apparatus of FIG. 16 adopts a configuration in which connection switches 181 to 184 are added as compared with the OFDM transmitting and receiving apparatus of FIG. 3.

The connection switches 181 to 184 perform connection and disconnection based on a channel type signal. Then, the connection switches 181 to 184 output only the signal, which relates to a specific channel such as a control channel among the received signals of subcarriers A to D output form the FFT converter 152, to the control circuit 162.

Thus, processing for calculating the coefficient of the specific channel is performed in a case where the characteristic is little deteriorated even if the coefficient to be used in performing weighting of amplitude is set to the same value in a plurality of bursts such as a case wherein the variation in the link is slow. Whereby making it possible to reduce average power consumption.

For reference sake, the eleventh embodiment can be combined with any one of the second to tenth embodiments.

TWELFTH EMBODIMENT

Figure 17:
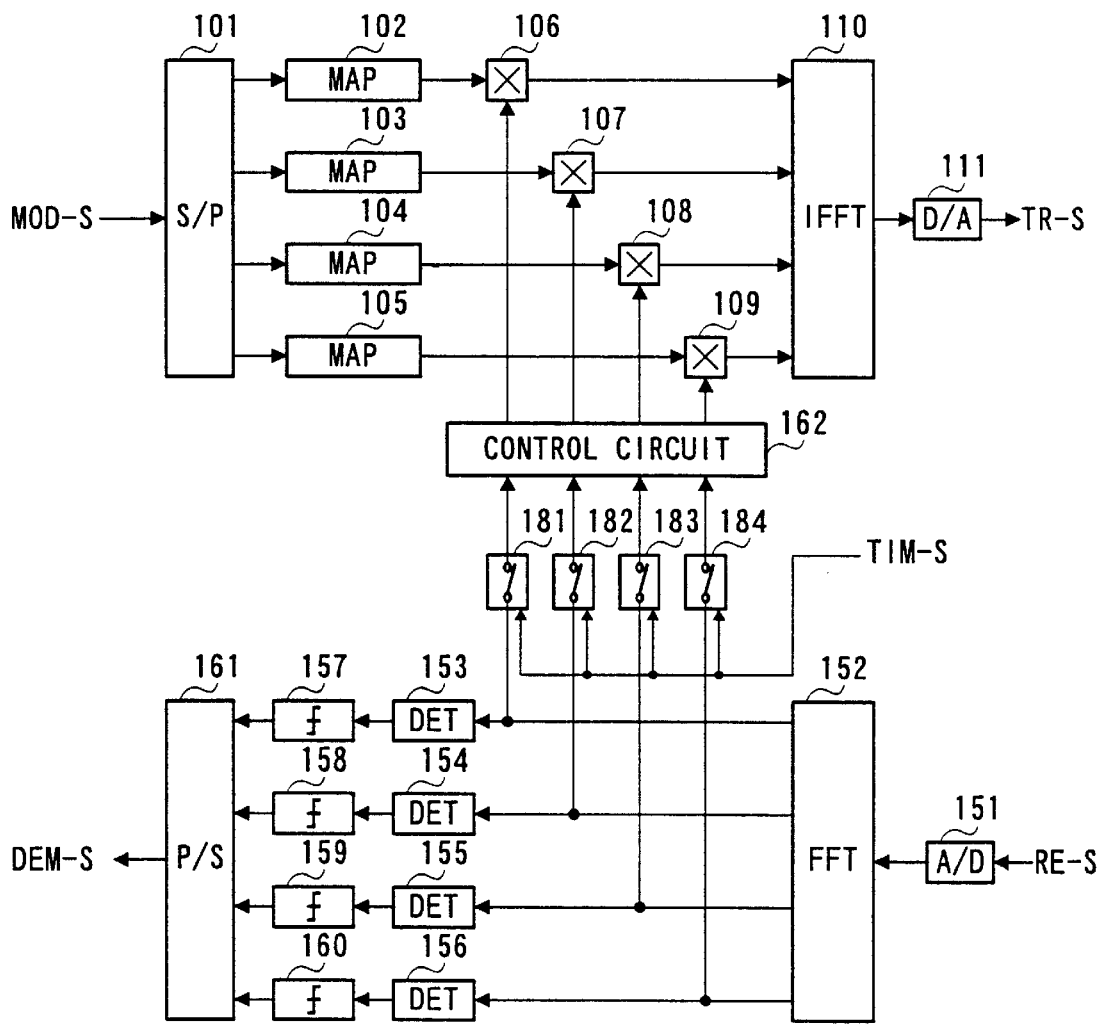
FIG. 17 is a block diagram showing a configuration of the OFDM transmitting and receiving apparatus according to a twelfth embodiment.

FIG. 17 is a block diagram showing a configuration of the OFDM transmitting and receiving apparatus according to the twelfth embodiment of the present invention. In the OFDM transmitting and receiving apparatus shown in FIG. 17, the same reference numerals as those of FIG. 3 are added to the portions common to the OFDM transmitting and receiving apparatus of FIG. 3, and the explanation is omitted.

The OFDM transmitting and receiving apparatus of FIG. 17 adopts a configuration in which connection switches 191 to 194 are added as compared with the OFDM transmitting and receiving apparatus of FIG. 3.

The connection switches 191 to 194 perform connection and disconnection based on a timing signal. Then, the connection switches 191 to 194 output only a pilot symbol among the received signals of subcarriers A to D, which have been output form the FFT converter 152, to the control circuit 162.

Whereby, coefficient can be determined by use of only the pilot symbol. Therefore, even in such a modulation system that information is superimposed on amplitude in addition to phase as in 16QAM, the pilot symbol has generally a low modulation multivalued number, the coefficient is not changed by the modulation signal and deterioration of characteristic can be prevented.

For reference sake, the twelfth embodiment can be combined with any one of the second to tenth embodiments.

THIRTEENTH EMBODIMENT

Figure 18:
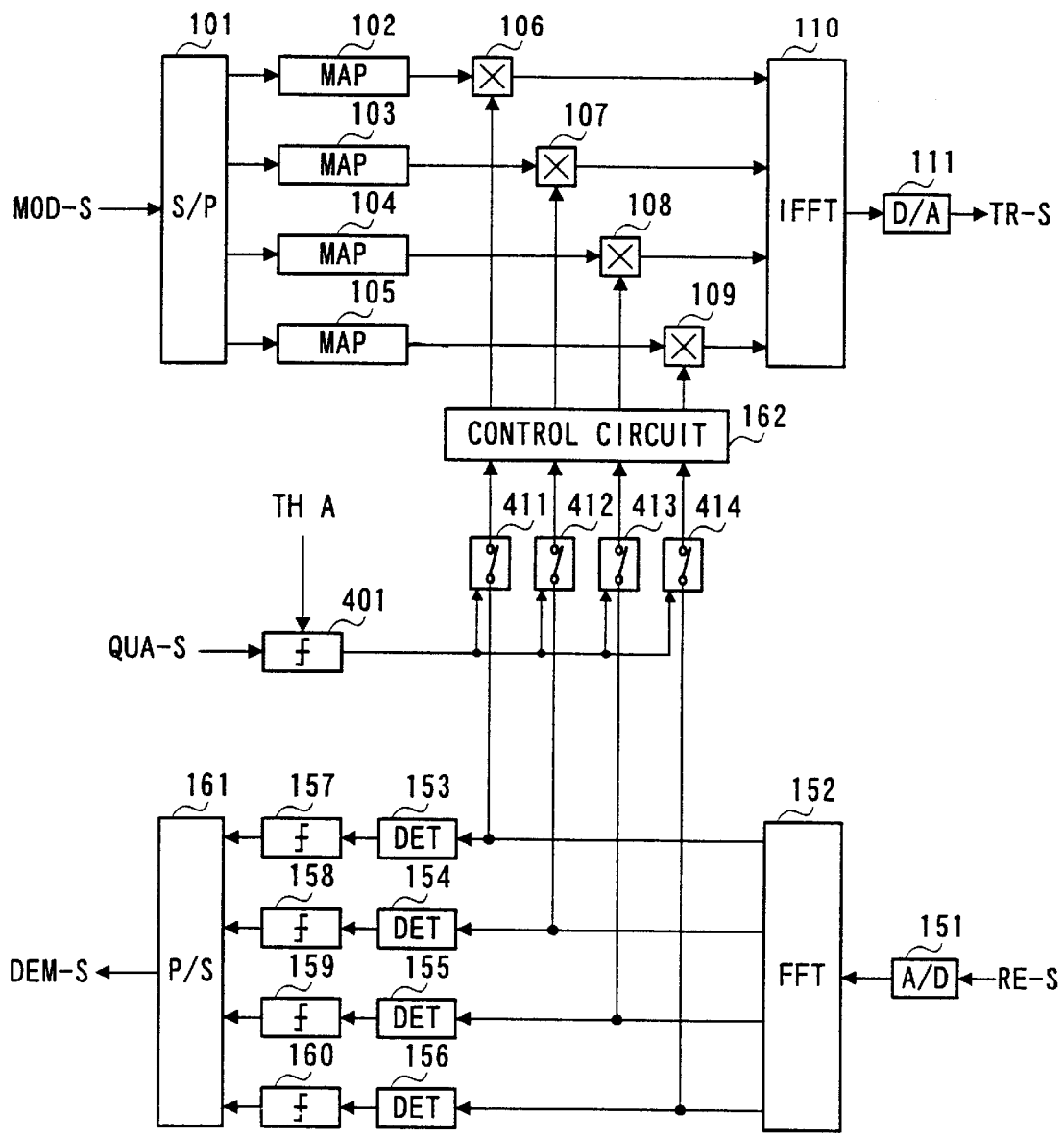
FIG. 18 is a block diagram showing a configuration of the OFDM transmitting and receiving apparatus according to a thirteenth embodiment.

FIG. 18 is a block diagram showing a configuration of the OFDM transmitting and receiving apparatus according to the thirteenth embodiment of the present invention. In the OFDM transmitting and receiving apparatus shown in FIG. 18, the same reference numerals as those of FIG. 3 are added to the portions common to the OFDM transmitting and receiving apparatus of FIG. 3, and the explanation is omitted.

The OFDM transmitting and receiving apparatus of FIG. 18 adopts a configuration in which determination unit 401 and connection switches 411 to 414 are added as compared with the OFDM transmitting and receiving apparatus of FIG. 3.

The determination unit 401 compares a link quality signal wherein a quality of link is expressed by a numeral form with a preset threshold value A. Then, the determination unit 401 controls the selector switches 411 to 414 to connect only the switch, which deals with the user wherein the link quality signal exceeds the threshold value A, among these switches. For reference sake, the quality of link can be converted into number by a difference in level between the signals before and after a hard determination in the modulation is performed.

The connection switches 411 to 414 perform connection and disconnection based on control of the determination unit 401. Then, the connection switches 411 to 414 output only the signal whose link quality is poor among the received signals of subcarriers A to D, which have been output form the FFT converter 152, to the control circuit 162.

Since this makes it possible to provide gain control to only the user whose link quality is poor, the reduction in the memory capacity can be improved as satisfying a fixed error rate characteristic.

For reference sake, the thirteenth embodiment can be combined with any one of the second to twelfth embodiments.

FOURTEENTH EMBODIMENT

Figure 19:
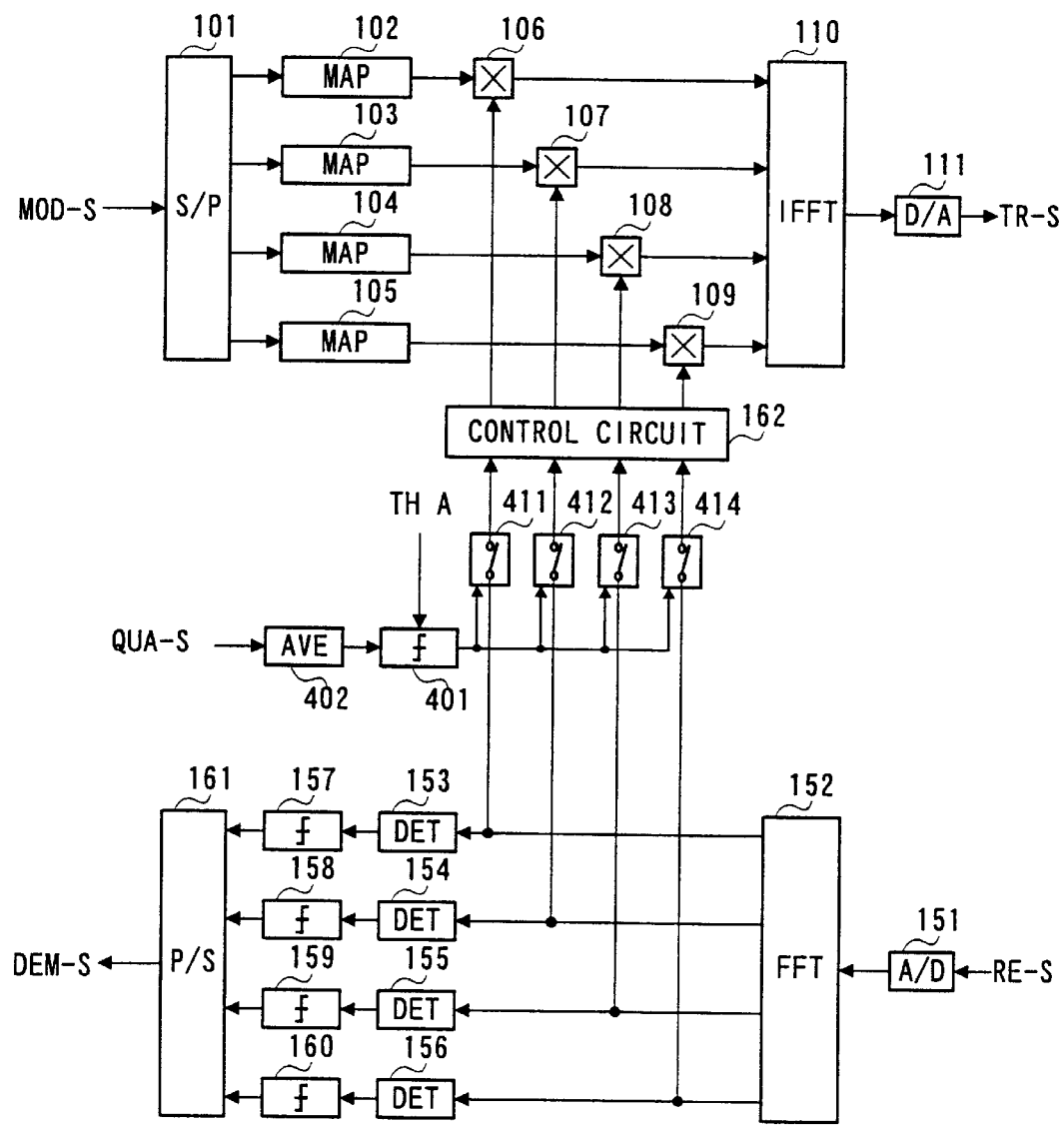
FIG. 19 is a block diagram showing a configuration of the OFDM transmitting and receiving apparatus according to a fourteenth embodiment.

FIG. 19 is a block diagram showing a configuration of the OFDM transmitting and receiving apparatus according to the fourteenth embodiment of the present invention. In the OFDM transmitting and receiving apparatus shown in FIG. 19, the same reference numerals as those of FIG. 18 are added to the portions common to the OFDM transmitting and receiving apparatus of FIG. 18, and the explanation is omitted.

The OFDM transmitting and receiving apparatus of FIG. 19 adopts a configuration in which an averaging circuit 402 is added as compared with the OFDM transmitting and receiving apparatus of FIG. 18.

The averaging circuit 402 averages the line quality signals through the plurality of frames, and calculates an average value of the link quality signals.

The determination unit 401 compares the average value of the link quality signals with the preset threshold value A. Then, the determination unit 401 controls the selector switches 411 to 414 to connect only the switch, which deals with the user wherein the average value of the link quality signals exceeds the threshold value A, among these switches.

This makes it possible to select the user to be subjected to gain control more accurately than the thirteenth embodiment.

For reference sake, the fourteenth embodiment can be combined with any one of the second to twelfth embodiments.

FIFTEENTH EMBODIMENT

Figure 20:
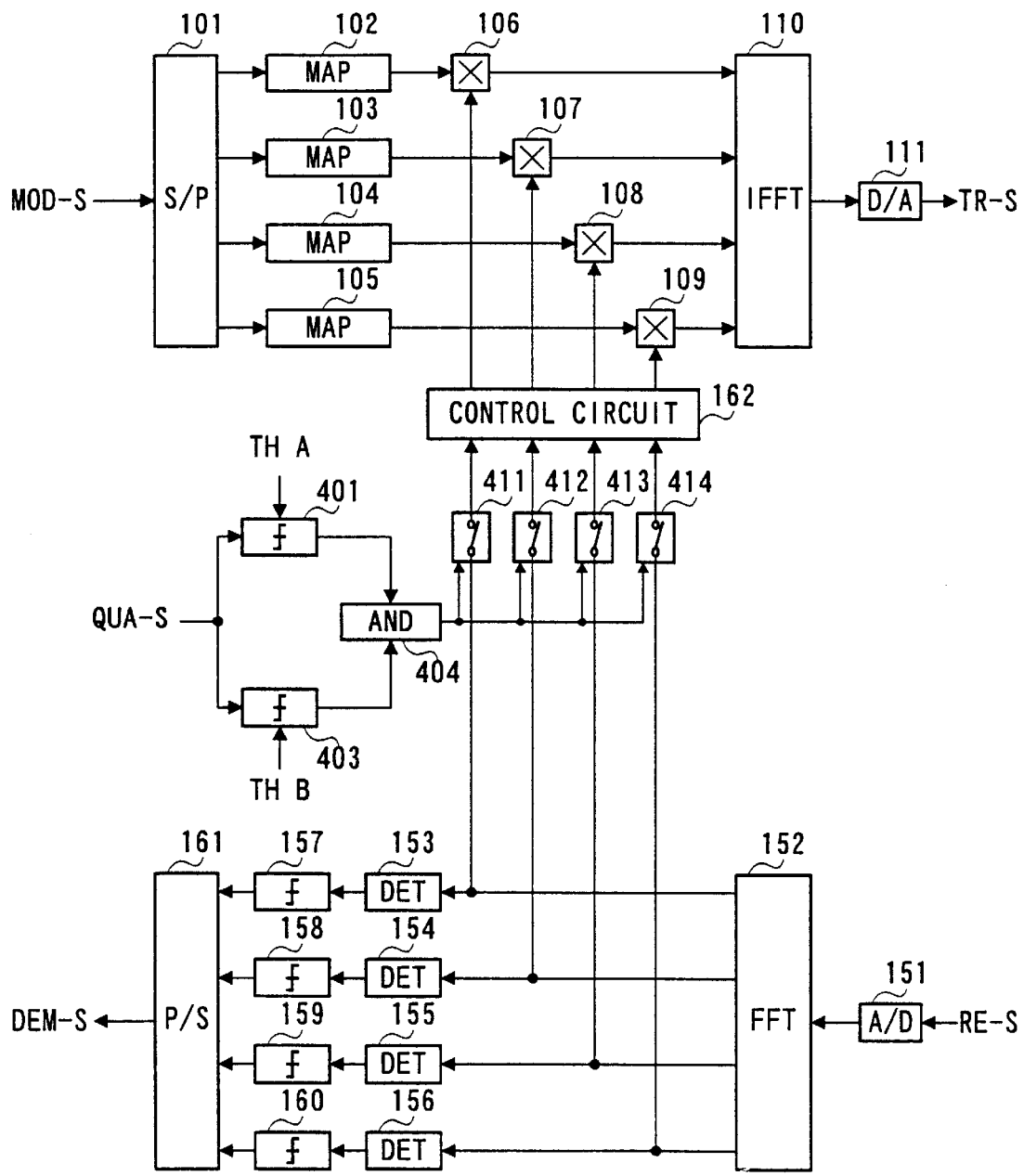
FIG. 20 is a block diagram showing a configuration of the OFDM transmitting and receiving apparatus according to a fifteenth embodiment.

FIG. 20 is a block diagram showing a configuration of the OFDM transmitting and receiving apparatus according to the fifteenth embodiment of the present invention. In the OFDM transmitting and receiving apparatus shown in FIG. 20, the same reference numerals as those of FIG. 18 are added to the portions common to the OFDM transmitting and receiving apparatus of FIG. 18, and the explanation is omitted.

The OFDM transmitting and receiving apparatus of FIG. 20 adopts a configuration in which a determination unit 403 and an AND circuit 404 are added as compared with the OFDM transmitting and receiving apparatus of FIG. 18.

The termination unit 401 compares the link quality signal with the preset threshold value A, and outputs a signal showing a comparison result to the AND circuit 404. The termination unit 403 compares the link quality signal with the preset threshold value B, and outputs a signal showing a comparison result to the AND circuit 404. Suppose that the threshold value B is higher than the threshold value A.

The AND circuit 404 controls the selector switches 411 to 414 to connect only the switch, which deals with the user wherein the average value of the link quality signals exceeds the threshold value A and is below the threshold value B, among these switches.

The connection switches 411 to 414 perform connection and disconnection based on control of the AND circuit 404. Then, the connection switches 411 to 414 output only the signal whose link quality is poor among the received signals of subcarriers A to D excepting one whose link quality is extremely poor, which have been output form the FFT converter 152, to the control circuit 162.

Whereby, since no gain control is provided to the user whose link quality is extremely poor, it is possible to select only the user that can improve the error rate characteristic by gain control.

For reference sake, the fifteenth embodiment can be combined with any one of the second to twelfth and fourteenth embodiments.

SIXTEENTH EMBODIMENT

Figure 21:
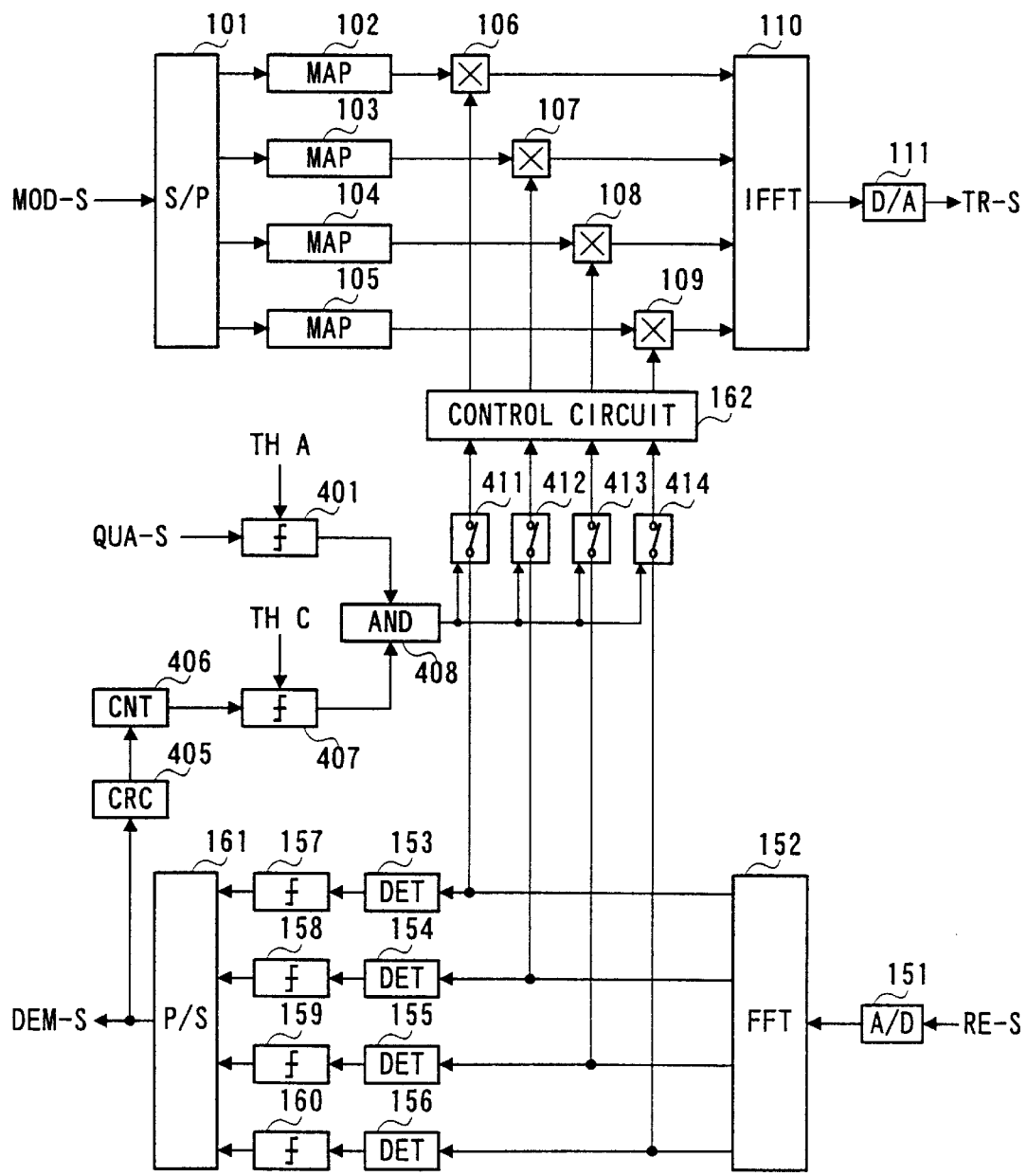
FIG. 21 is a block diagram showing a configuration of the OFDM transmitting and receiving apparatus according to a sixteenth embodiment.

FIG. 21 is a block diagram showing a configuration of the OFDM transmitting and receiving apparatus according to the sixteenth embodiment of the present invention. In the OFDM transmitting and receiving apparatus shown in FIG. 21, the same reference numerals as those of FIG. 18 are added to the portions common to the OFDM transmitting and receiving apparatus of FIG. 18, and the explanation is omitted.

The OFDM transmitting and receiving apparatus of FIG. 21 adopts a configuration in which a CRC (Cyclic Redundancy Check) circuit 405, a counter 406, a determination unit 407 and an AND circuit 408 are added as compared with the OFDM transmitting and receiving apparatus of FIG. 18.

The termination unit 401 compares the link quality signal with the preset threshold value A, and outputs a signal showing a comparison result to the AND circuit 408.

The CRC circuit 405 checks correctness and error of a check bit of the signal output from the P/S converter 161. Then, the CRC circuit 405 outputs a pulse signal to the counter 406 when the check bit is error.

The counter 406 counts the number of pulse signals output from the CRC circuit 405 over a predetermined period, for example, 10 frames, and outputs a counted value to the determination unit 407.

The determination unit 407 compares the counted value output from the counter 406 with a preset value C, and outputs a signal showing a comparison result to the AND circuit 408.

The AND circuit 408 controls the selector switches 411 to 414 to connect only the switch, which deals with the user wherein the link quality signal is below the threshold value A, among these switches when the counted value is below the threshold value C.

The connection switches 411 to 414 perform connection and disconnection based on control of the AND circuit 408. Then, the connection switches 411 to 414 output only the signal whose link quality is poor among the received signals of subcarriers A to D, which have been output form the FFT converter 152, to the control circuit 162.

Whereby, only when the number of error check bits is small and a propagation environment is good as a result of the CRC, gain control is performed. This makes it possible to select the user to be subjected to gain control more accurately than the thirteenth embodiment.

For reference sake, the sixteenth embodiment can be combined with any one of the second to twelfth, fourteenth and fifteenth embodiments.

SEVENTEENTH EMBODIMENT

Figure 22:
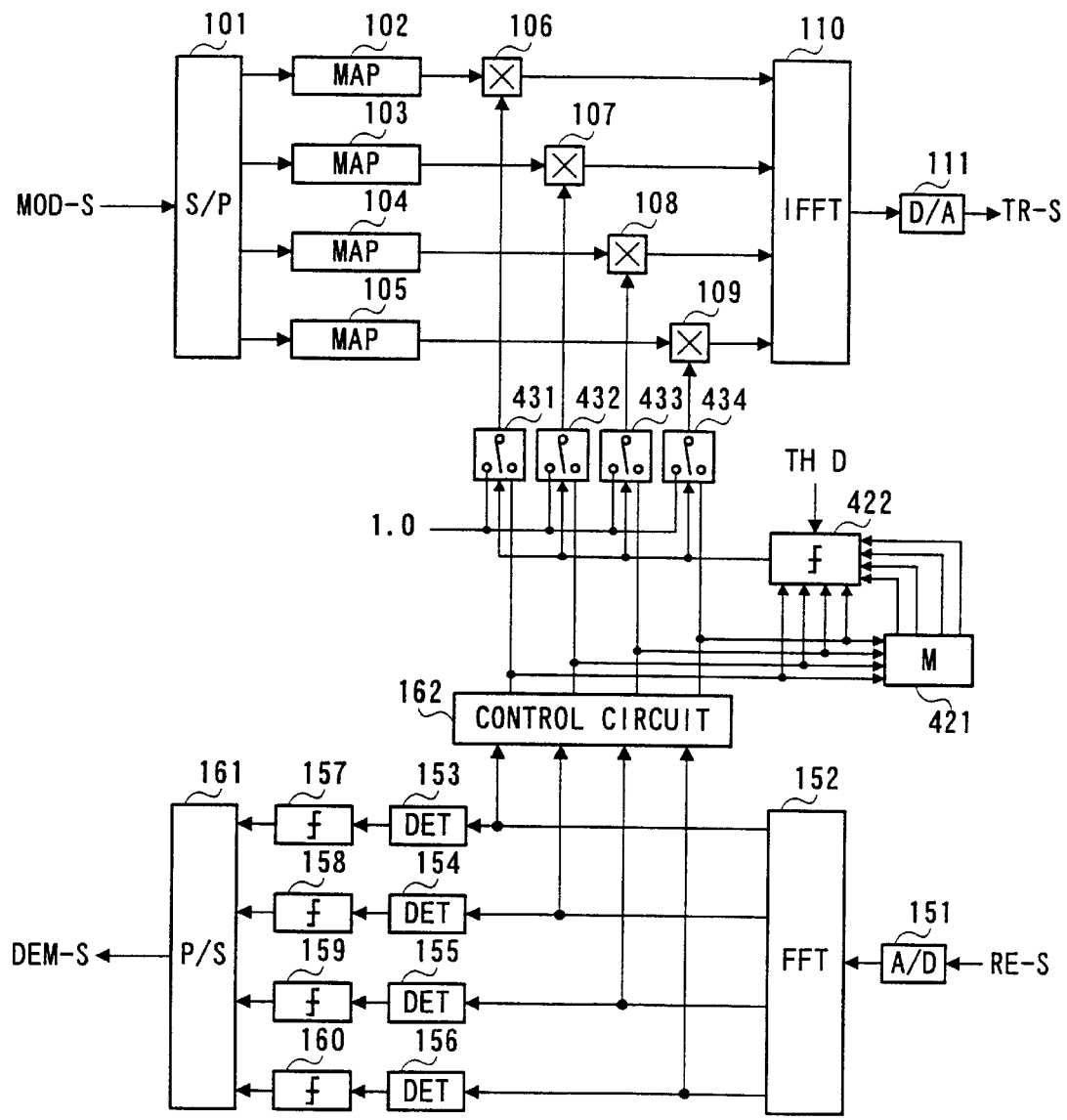
FIG. 22 is a block diagram showing a configuration of the OFDM transmitting and receiving apparatus according to a seventeenth embodiment.

FIG. 22 is a block diagram showing a configuration of the OFDM transmitting and receiving apparatus according to the seventeenth embodiment of the present invention. In the OFDM transmitting and receiving apparatus shown in FIG. 22, the same reference numerals as those of FIG. 3 are added to the portions common to the OFDM transmitting and receiving apparatus of FIG. 3, and the explanation is omitted.

The OFDM transmitting and receiving apparatus of FIG. 22 adopts a configuration in which a memory 421, a determination unit 422, and selector switches 431 to 434 are added as compared with the OFDM transmitting and receiving apparatus of FIG. 3.

The memory 421 temporarily stores the coefficients output from the control circuit 162. Then, when a coefficient is newly input, the coefficients stored are output, thereby updating the coefficient.

The determination unit 422 calculates a coefficient difference that is a difference between the coefficient output from the control circuit 162 this time and the coefficient previously output from the memory 421. Then, the determination unit 422 compares the coefficient difference and a preset threshold value D. After that, the determination unit 422 controls the selector switches 431 to 434 in order to output the coefficient output from the control circuit 162 in a case where the coefficient difference is below the threshold value D, and to output a coefficient of "1.0" to the multipliers 106 to 109 in other cases.

The selector switches 431 to 434 output the coefficient output from the control circuit 162 or "1.0" to the multipliers 106 to 109.

Whereby, there is not performed gain control of subcarriers wherein the link condition of the reverse link and that of the forward link are largely different from each other such as a case in which the variation in the link is faster than time interval between the reverse link and the forward link. This makes it possible to prevent the error rate characteristic from being deteriorated.

For reference sake, the seventeenth embodiment can be combined with any one of the second to sixteenth embodiments.

EIGHTEENTH EMBODIMENT

An eighteenth embodiment is one wherein processing for assigning a weight to transmission power every subcarrier and processing for performing selection diversity by a plurality of antenna branches are combined to each other. In the eighteenth embodiment, the explanation is given on the assumption that the number of transmission and reception branches is two (BR1 and BR2).

Figure 23:
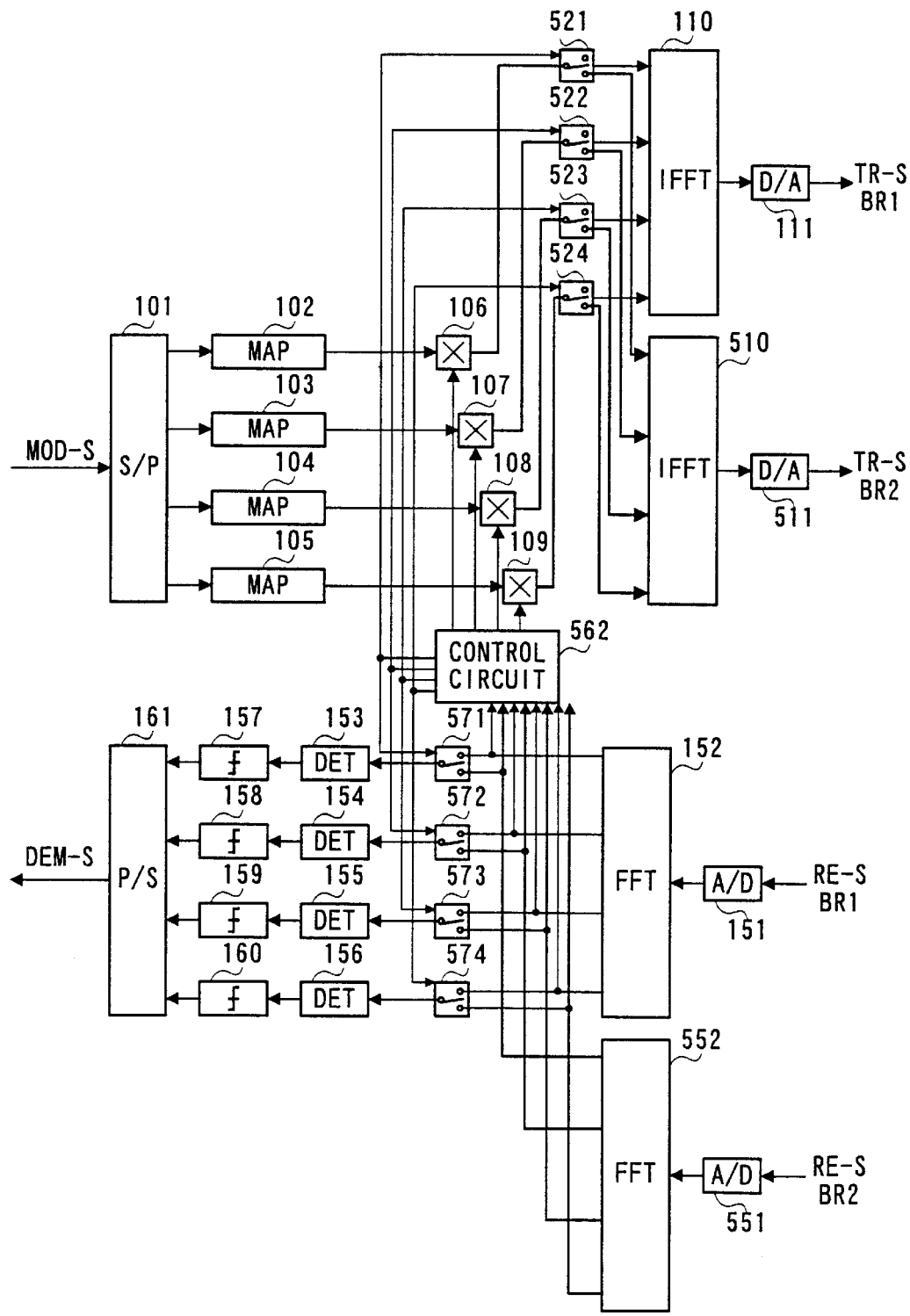
FIG. 23 is a block diagram showing a configuration of the OFDM transmitting and receiving apparatus according to an eighteenth embodiment.

FIG. 23 is a block diagram showing a configuration of the OFDM transmitting and receiving apparatus according to the eighteenth embodiment of the present invention. In the OFDM transmitting and receiving apparatus shown in FIG. 23, the same reference numerals as those of FIG. 3 are added to the portions common to the OFDM transmitting and receiving apparatus of FIG. 3, and the explanation is omitted.

As compared with the OFDM transmitting and receiving apparatus of FIG. 3, the OFDM transmitting and receiving apparatus of FIG. 23 adopts a configuration in which selector switches 521 to 524, IFFT circuit 510, and D/A converter 511 are added to the transmitting side and A/D converter 551, FFT circuit 552, and selector switches 571 to 574 are added to the receiving side. In addition, the OFDM transmitting and receiving apparatus of FIG. 23 adopts a configuration in which a control circuit 562 for outputting a control signal and a coefficient signal is used in place of the control circuit 162 for outputting the coefficient signal.

The selector switches 521 to 524 switch the transmission branch for mapped signals of subcarriers based on the control signal, respectively.

The IFFT circuit 510 provides inverse fast Fourier transform to the input transmitting signal, similar to the IFFT circuit 110. The D/A converter 511 D/A (Digital/Analog) converts the output signal of IFFT circuit 510 so as to output transmitting signal of branch 2, similar to the D/A converter 111.

The A/D converter 551 D/A (Digital/Analog) converts the received signal of branch 2, similar to the A/D converter 151. The FFT circuit 552 provides inverse fast Fourier transform to the signal of branch 2 converted to the digital signal, similar to the FFT circuit 152.

The selector switches 571 to 574 output the output signal of any one of the FFT circuit 152 and FFT circuit 552 to detectors 153 to 156 every subcarrier based on the control signal.

The control circuit 562 calculates the coefficient by which the transmitting signal of each subcarrier is multiplied, and selects a transmission branch based on the output signals of FFT circuit 152 and FFT circuit 552. Then, the coefficient signal is output to the multipliers 106 to 109, and the control signal is output to the selector switches 521 to 524 and the selector switches 571 to 574.

Next, a specific configuration of the control circuit 562 will be explained with reference to the block diagram of FIG. 24. In the control circuit 562 of the OFDM transmitting and receiving apparatus of FIG. 24, the same reference numerals as those of FIG. 4 are added to the portions common to the control circuit 162 of the OFDM transmitting and receiving apparatus of FIG. 4, and the explanation is omitted.

Figure 24:
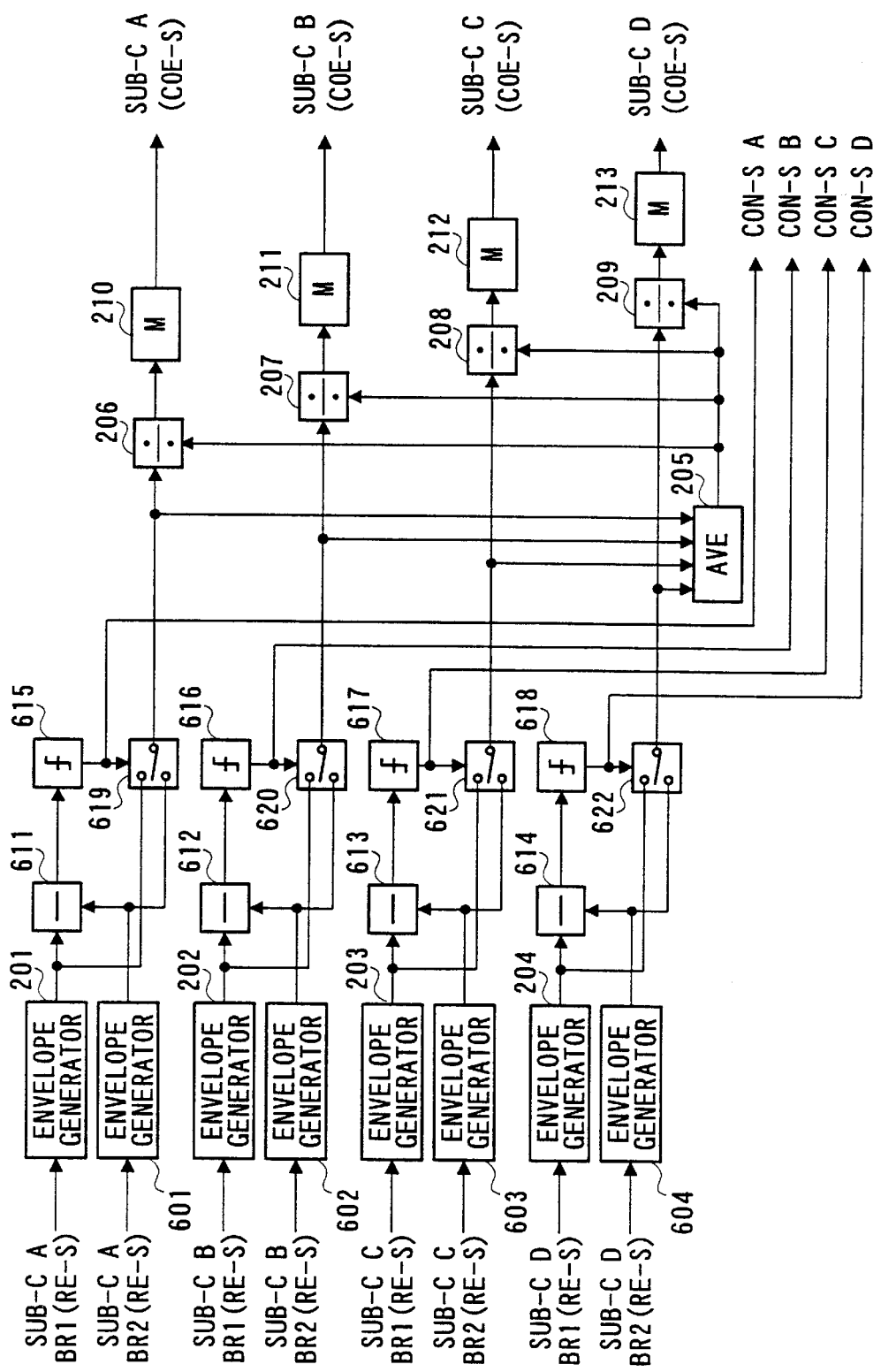
FIG. 24 is a block diagram showing a configuration of the periphery of a control circuit of the OFDM transmitting and receiving apparatus according to the eighteenth embodiment of the present invention.

The control circuit 562 of the OFDM transmitting and receiving apparatus of FIG. 24 adopts a configuration in which digital subtracters 611 to 614, determination units 615 to 618, and selector switches 619 to 622 are added as compared with the control circuit 162 of the OFDM transmitting and receiving apparatus of FIG. 4.

The digital subtracters 611 to 614 subtract the output signals of the envelope generators 601 to 604 from the output signals of the envelope generators 201 to 204, respectively, and output the subtraction results to the determination units 615 to 619, respectively.

In a case where the codes of the output signals of digital subtracters 611 to 614 are positive, the determination units 615 to 619 determine that a branch suitable for the transmitting signal of subcarrier A is branch 1. In other cases, they determine that a branch suitable for the transmitting signal of subcarrier A is branch 2. Then, a control signal (CON-S) on which the determination result is mounted is output to the selector switches 619 to 622, selector switches 521 to 524, and selector switches 571 to 574.

The selector switches 619 to 622 output the output signals of any one of the envelope generators 201 to 204 and the envelope generator 601 to 604 to the averaging circuit 205 and the dividers 206 to 209, respectively, based on the control signals output from the determination units 615 to 619.

Thus, processing for assigning a weight to transmission power every subcarrier and processing for performing transmission diversity are combined to each other. This makes it possible to dramatically improve the error rate characteristic.

Particularly, the use of the present apparatus in the base station apparatus makes it possible to improve the error rate characteristic of the forward link without increasing the hardware scale of the communication terminal apparatus.

Gain control is provided to the transmission diversity. so that a drop in reception level due to phasing can be largely reduced as compared with the case of the single branch. This makes it possible to considerably lessen the gain control value and to largely decrease peak power.

Moreover, since there are subcarriers, which have not been transmitted, in each branch, provision of gain control to the transmission diversity makes it possible to reduce transmission power corresponding to the amount of subcarriers, which have not been transmitted, as compared with the case of the single branch.

For reference sake, in the eighteenth embodiment, the explanation was given on the assumption that the number of transmission and reception branches was two. However, the present invention does not limit the number of subcarriers, and the number of transmission and reception branches. Furthermore, it is possible to use the selection diversity in only the receiving side.

NINETEENTH EMBODIMENT

Figure 25:
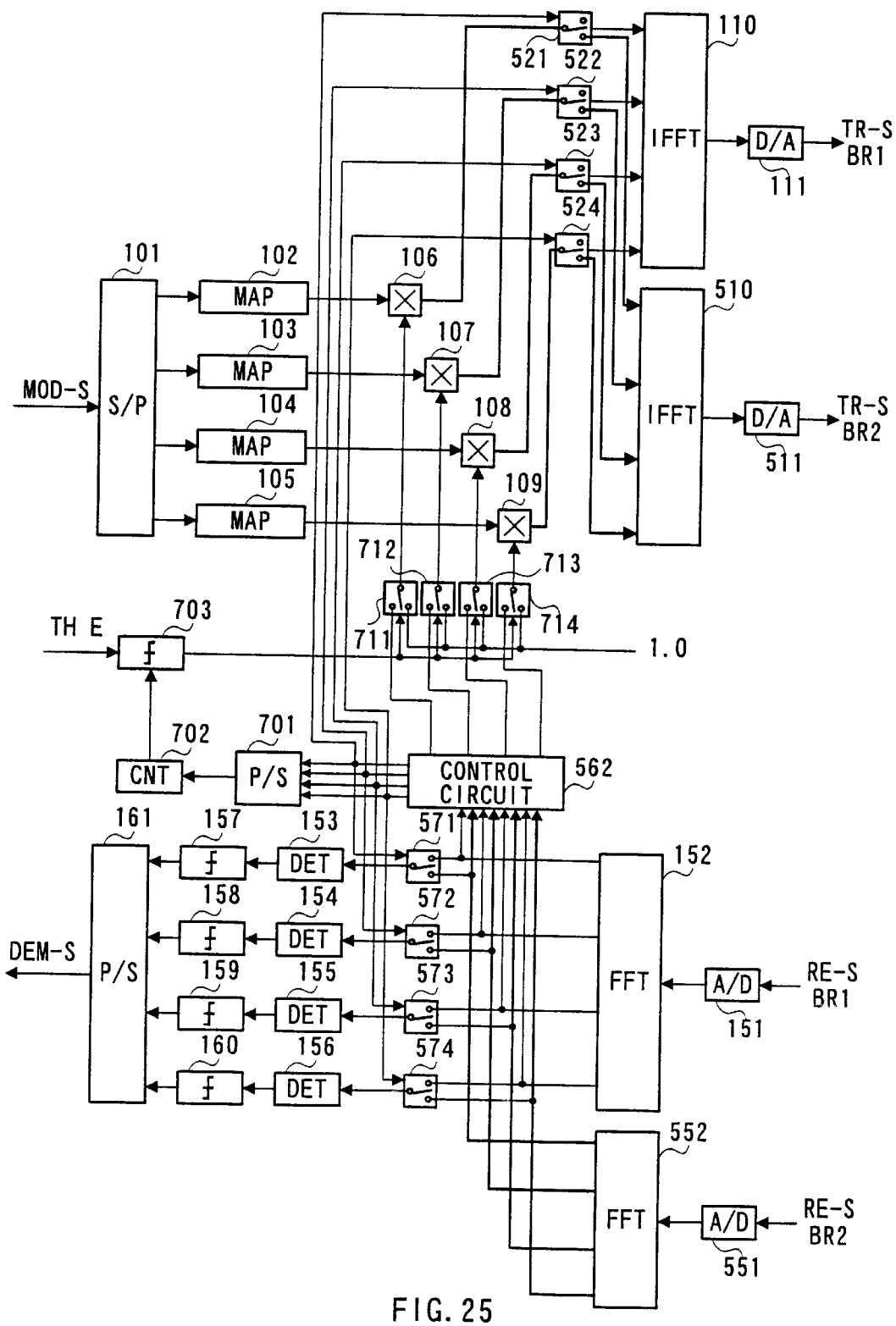
FIG. 25 is a block diagram showing a configuration of the OFDM transmitting and receiving apparatus according to a nineteenth embodiment.

FIG. 25 is a block diagram showing a configuration of the OFDM transmitting and receiving apparatus according to the nineteenth embodiment of the present invention. In the OFDM transmitting and receiving apparatus shown in FIG. 25, the same reference numerals as those of FIG. 23 are added to the portions common to the OFDM transmitting and receiving apparatus of FIG. 23, and the explanation is omitted.

As compared with the OFDM transmitting and receiving apparatus of FIG. 23, the OFDM transmitting and receiving apparatus of FIG. 25 adopts a configuration in which a P/S converter 701, a counter 702, a determination unit 703, and selector switches 711 to 714 are added.

The P/S converter 701 converts a control signal for selecting a transmission branch output from the control circuit 562 in series, and outputs it to the counter 702.

The counter 702 counts the number of selected subcarriers every transmission branch based on the control signal output from the P/S converter 701, and outputs the counted value to the determination unit 703.

The determination unit 703 compares a maximum value of the counted value output from the counter 702 with a preset threshold value E. In a case where the maximum value of the counted value exceeds the threshold value E, the determination unit 703 controls the selectors switches 711 to 714 such that the subcarrier transmitted from the corresponding branch is multiplied by coefficient "1.0", and the other subcarriers are multiplied by the coefficient output from the control circuit 562.

The selector switches 711 to 714 output the coefficient output from the control circuit 562 or coefficient "1.0" to the multipliers 106 to 109 based on control of the determination unit 703.

Here, the possibility that the number of subcarriers to be transmitted from a specific branch will be greatly increased is considerably low. In this case, the error rate is little deteriorated even if no gain control is performed. Accordingly, in a case where the number of subcarriers to be transmitted from the specific branch is extremely great, no gain control is performed as in this embodiment. This makes it possible to improve both the error rate characteristic and the reduction in peak power.

TWENTIETH EMBODIMENT

Figure 26:
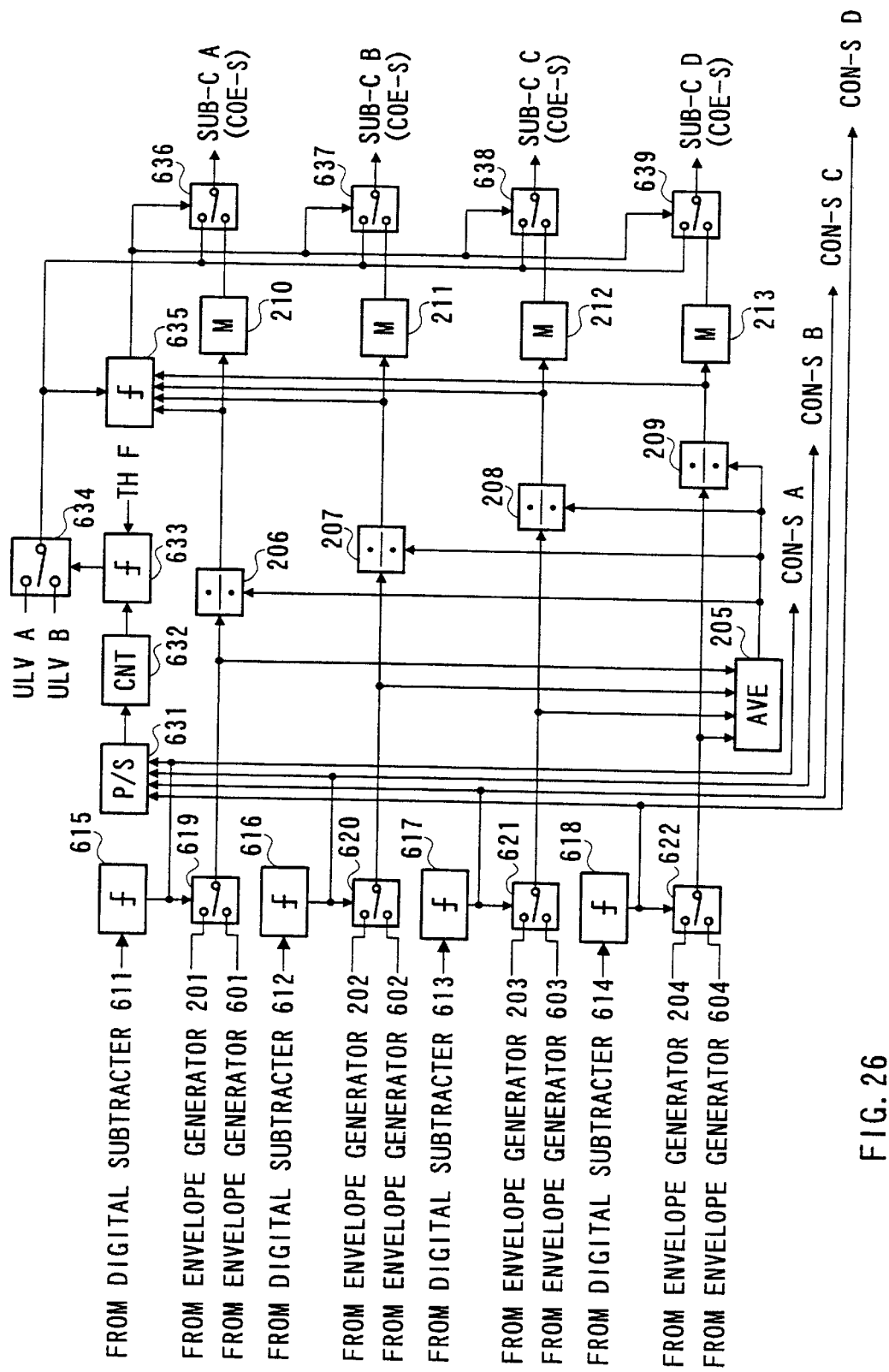
FIG. 26 is a block diagram showing a configuration of the periphery of a control circuit of the OFDM transmitting and receiving apparatus according to a twentieth embodiment of the present invention.

FIG. 26 is a block diagram showing a configuration of the OFDM transmitting and receiving apparatus according to the twentieth embodiment of the present invention. In the OFDM transmitting and receiving apparatus shown in FIG. 26, the same reference numerals as those of FIG. 24 are added to the portions common to the OFDM transmitting and receiving apparatus of FIG. 24, and the explanation is omitted.

As compared with the OFDM transmitting and receiving apparatus of FIG. 24, the OFDM transmitting and receiving apparatus of FIG. 26 adopts a configuration in which a P/S converter 631, a counter 632, a determination unit 633, a determination unit 635, and selector switches 636 to 639 are added to the control circuit 562.

The P/S converter 631 series-converts a control signal on which a determination result output from the determination units 615 to 618 is mounted, and outputs it to the counter 632.

The counter 632 counts the number of subcarriers to be transmitted every transmission branch based on the control signal output from the P/S converter 631, and outputs the counted value to the determination unit 633.

The determination unit 633 compares a maximum value of the counted value output from the counter 632 with a preset threshold value F. The determination unit 633 controls the selector switch 634 to select an upper limit value A (for example, "2.0") in a case where the maximum value of the counted value is below the threshold value F, and to select an upper limit B (for example, "1.5") in other cases. In this case, suppose that the upper limit value A is higher than the upper limit value B.

The selector switch 634 outputs the upper limit value A or the upper limit value B to the determination unit 635 and the selector switches 636 to 639 based on control of the determination unit 633.

The determination unit 635 controls the selector switches 635 to 639 such that the coefficient signals stored in the memories 210 to 213 are output to the multipliers 106 to 109 if the coefficient signals of the respective subcarriers are less than the upper limit value output from the selector switch 634, and the upper limit value is output to the multipliers 106 to 109 if they exceed the upper limit value.

Thus, the upper limit value of the coefficient by which the transmitting signal is multiplied is changed by the number of subcarriers to be transmitted from the specific branch. This makes it possible to reduce peak power as maintaining the error rate characteristic as compared with the case in which the upper limit value is fixed.

TWENTY-FIRST EMBODIMENT

Figure 27:
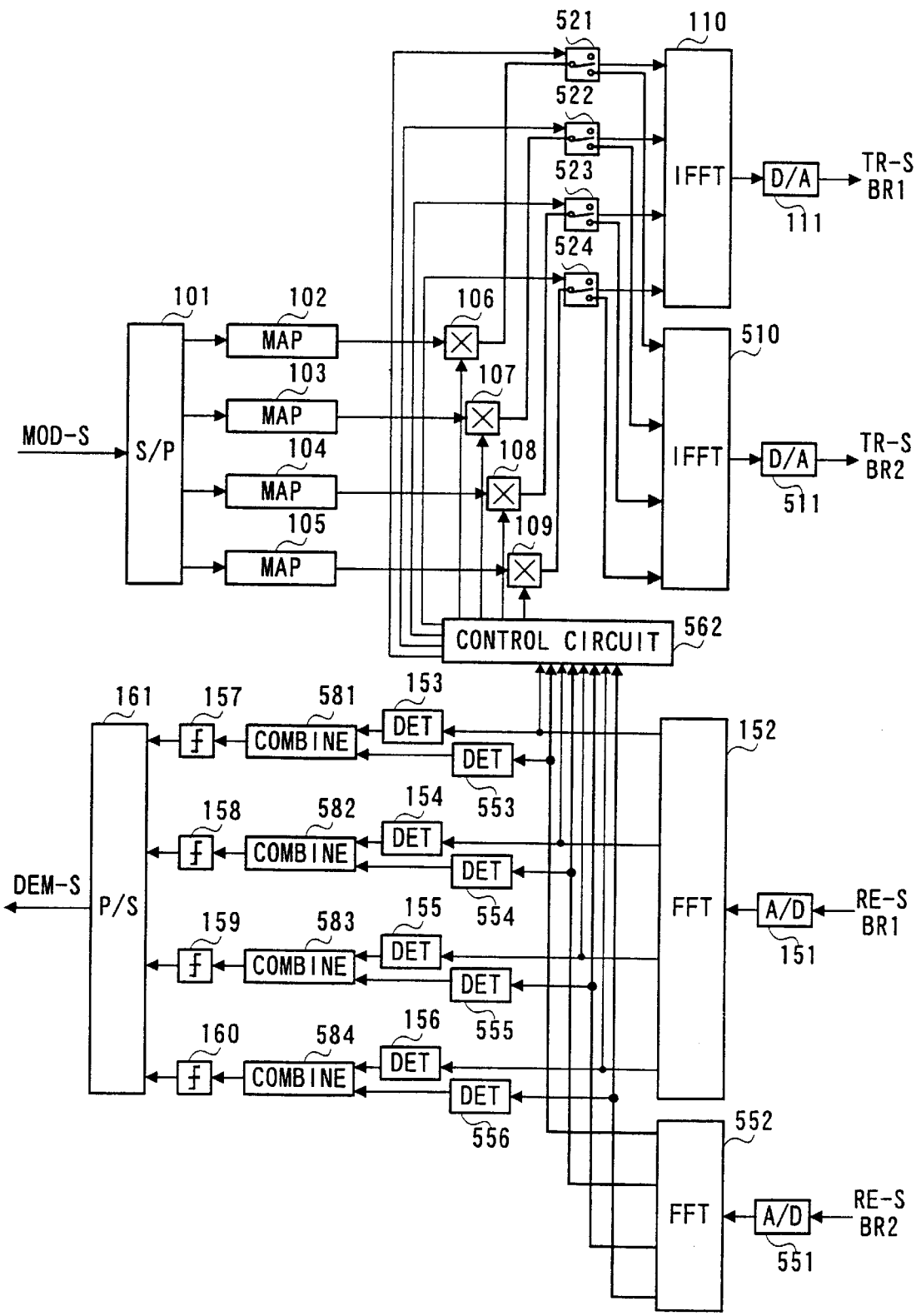
FIG. 27 is a block diagram showing a configuration of the OFDM transmitting and receiving apparatus according to a twenty-first embodiment.

FIG. 27 is a block diagram showing a configuration of the OFDM transmitting and receiving apparatus according to the twenty-first embodiment of the present invention. In the OFDM transmitting and receiving apparatus shown in FIG. 27, the same reference numerals as those of FIG. 23 are added to the portions common to the OFDM transmitting and receiving apparatus of FIG. 23, and the explanation is omitted.

As compared with the OFDM transmitting and receiving apparatus of FIG. 23, the OFDM transmitting and receiving apparatus of FIG. 27 adopts a configuration in which the selector switches 571 to 574 are deleted from the receiving side and detectors 553 to 556, and combining circuits 581 to 584 are added thereto.

The FFT circuit 152 provides fast Fourier transform to the signal of the branch 1, which has been converted to the digital signal, and outputs the received signals of subcarriers A to D to the detectors 153 to 156. Similarly, the FFT circuit 552 provides fast Fourier transform to the signal of the branch 2, which has been converted to the digital signal, and outputs the received signals of subcarriers A to D to the detectors 553 to 556.

The detectors 153 to 156 provide detection processing to the signals of subcarriers A to D output from the FFT circuit 152, respectively. Similarly, the detectors 553 to 556 provide detection processing to the signals of subcarriers A to D output from the FFT circuit 552, respectively.

The combining circuits 581 to 584 combine the signals of subcarriers A to D, which have bee detected by the detectors 153 to 156 and the detectors 553 to 556, respectively. The determination units 157 to 160 provide determination to the combined signals of subcarriers A to D, respectively, and demodulate them.

Thus, the error rate characteristic can be improved by performing combination diversity every subcarrier at the receiving side. Particularly, in the case where the present apparatus is used in the base station apparatus, the error rate of the reverse link can be improved without performing gain control at the mobile station side. This eliminates the need for increasing the hardware scale of the mobile station.

TWENTY-SECOND EMBODIMENT

Figure 28:
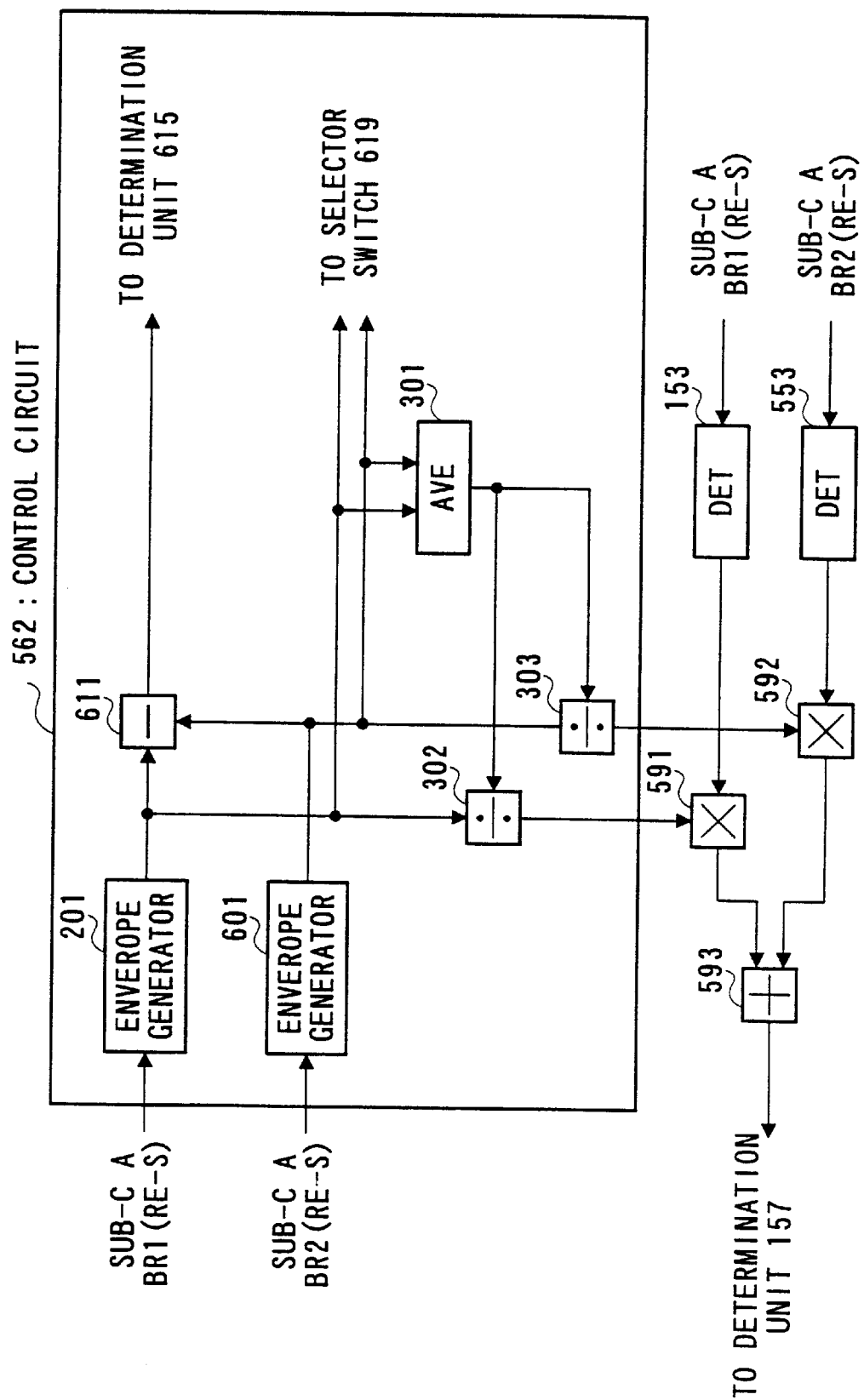
FIG. 28 is a block diagram showing a configuration of the OFDM transmitting and receiving apparatus according to a twenty-second embodiment.

FIG. 28 is a block diagram showing a configuration of a main part of the OFDM transmitting and receiving apparatus according to the twenty-second embodiment. FIG. 28 shows only the part relating to the signal of the subcarrier A at the receiving side. In the OFDM transmitting and receiving apparatus shown in FIG. 28, the same reference numerals as those of FIGS. 23 and 24 are added to the portions common to the OFDM transmitting and receiving apparatus of FIGS. 23 and 24, and the explanation is omitted.

As compared with the OFDM transmitting and receiving apparatus of FIGS. 23 and 24, the OFDM transmitting and receiving apparatus of FIG. 28 adopts a configuration in which multipliers 591, 592, and an adder 593 are used in place of the combining circuit 581, and an averaging circuit 301 and dividers 302 and 303 are added to the control circuit 562.

The averaging circuit 301 calculates an average value of the output signal of the envelope generator 201 and that of the envelope generator 601. The divider 302 divides the output signal of the envelope generator 201 by the average value output from the averaging circuit 301, so that a weighting factor of the subcarrier A branch 1 is calculated. The divider 303 divides the output signal of the envelope generator 601 by the average value output from the averaging circuit 301, so that a weighting factor of the subcarrier A branch 2 is calculated.

The multiplier 591 multiplies the signal of the subcarrier A branch 1 detected by the detector 153 by the weighting factor of the subcarrier A branch 1. The multiplier 592 multiplies the signal of the subcarrier A branch 2 detected by the detector 553 by the weighting factor of the subcarrier A branch 2. The adder 593 adds the weighted signals output from the multipliers 591 and 592, and outputs the signal of branch A to the determination unit 157.

Whereby, since the signals received by the respective branches every subcarrier can be subjected to maximal-ratio combining, the error rate characteristic can be further improved as compared with the eighteenth embodiment.

For reference sake, in the above embodiments, the explanation was given on the assumption that the number of subcarriers was four. However, the present invention does not limit the number of subcarriers.

As explained above, according to the OFDM transmitting and receiving apparatus and the OFDM transmitting and receiving method, since the weight is assigned to transmission power every subcarrier and reception power at the partner station can be maintained substantially constant, the error rate characteristic can be improved.

This application is based on the Japanese Patent Applications No. HEI 10-316414 filed on Nov. 6, 1998, No. HEI 11-70814 filed on Mar. 16, 1999, and No. HEI 11-101733 filed on Apr. 8, 1999, entire contents of which are expressly incorporated by reference herein.

What is claimed is:

1. An OFDM transmitting and receiving apparatus comprising:

coefficient calculating means for calculating a coefficient for each subcarrier based on reception power of the received signals from a partner station of each subcarrier;

a plurality of weighting means for multiplying a transmitting signal to said partner station of each subcarrier by said coefficient to perform weighting; and information selecting means for outputting the received signal only when important information is transmitted, wherein said coefficient calculating means calculates the coefficient only when the received signal is input from said information selecting means.

2. An OFDM transmitting and receiving apparatus comprising:

coefficient calculating means for calculating a coefficient for each subcarrier based on reception power of the received signals from a partner station of each subcarrier;

a plurality of weighting means for multiplying a transmitting signal to said partner station of each subcarrier by said coefficient to perform weighting; and second symbol selecting means for outputting only a pilot symbol of the received signal to said coefficient calculating means, wherein said coefficient calculating means calculates a coefficient based on power of the pilot symbol of the received signal.

3. An OFDM transmitting and receiving apparatus comprising:

coefficient calculating means for calculating a coefficient for each subcarrier based on reception power of the received signals from a partner station of each subcarrier;

a plurality of weighting means for multiplying a transmitting signal to said partner station of each subcarrier by said coefficient to perform weighting; and fourth determining means for determining whether or not the link quality is larger than a second threshold value preset every user, wherein said coefficient calculating means calculates a coefficient with respect to only the weighting means corresponding to the user in which the link quality is larger than the second threshold value based on a determination result of said fourth determining means.

4. The OFDM transmitting and receiving apparatus according to claim 3, further comprising third averaging means for averaging the link quality every user, wherein said fourth determining means determines whether or not the average value of the link quality is larger than the second threshold value every user.

5. The OFDM transmitting and receiving apparatus according to claim 3, wherein said fourth determining means determines whether or not the link quality is smaller than a third threshold value preset every user, and said coefficient calculating means calculates a coefficient with respect to only the weighting means corresponding to the user in which the link quality is larger than the second threshold value and smaller than the third threshold value.

6. The OFDM transmitting and receiving apparatus according to claim 3, further comprising error detecting means for providing error detection to a demodulation signal; and fifth determining means for determining whether or not the number of error bits detected by said error detecting means for a predetermined period is smaller than a fourth threshold value preset every user, wherein said coefficient calculating means determines weighting means for calculating a coefficient based on the determination result of said fourth determining means only when said fifth determining means determines that the number of error bits is smaller than the fourth threshold value.

7. An OFDM transmitting and receiving apparatus comprising:

coefficient calculating means for calculating a coefficient for each subcarrier based on reception power of the received signals from a partner station of each subcarrier;

a plurality of weighting means for multiplying a transmitting signal to said partner station of each subcarrier by said coefficient to perform weighting; and sixth determining means for determining whether or not a link variation value is smaller than a fifth threshold value preset every subcarrier, wherein said coefficient calculating means outputs the calculated coefficient to only the weighting means corresponding to the subcarrier in which a difference in coefficient between this time and previous time is smaller than a fifth threshold value based on a determination result of said sixth determining means.

8. An OFDM transmitting and receiving apparatus comprising:

coefficient calculating means for calculating a coefficient for each subcarrier based on reception power of the received signals from a partner station of each subcarrier;

a plurality of weighting means for multiplying a transmitting signal to said partner station of each subcarrier by said coefficient to perform weighting; and branch selecting means for selecting a branch whose reception power is large as a transmission branch every subcarrier, wherein a diversity function is provided.

9. The OFDM transmitting and receiving apparatus according to claim 8, further comprising seventh determining means for determining whether or not the number of subcarriers transmitted from one branch is smaller than a sixth threshold value preset, wherein said coefficient calculating means outputs a calculated coefficient to the weighting means only when the number of subcarriers is smaller than the sixth threshold value based on a determination result of said seventh determining means.

10. The OFDM transmitting and receiving apparatus according to claim 8, further comprising upper limit value setting means for setting an upper limit value to be high when the number of subcarriers transmitted from one branch is small, and for setting the upper limit value to be low when the number of subcarriers transmitted from one branch is large, and ninth determining means for determining whether or not the coefficient is smaller than the upper limit value set by said upper limit setting means every subcarrier, wherein said coefficient calculating means outputs the upper limit value to the weighting means corresponding to the subcarrier in which the coefficient exceeds the upper limit value.

11. The OFDM transmitting and receiving apparatus according to claim 8, further comprising combining means for combining reception power of the respective branches every subcarrier.

12. The OFDM transmitting and receiving apparatus according to claim 11, wherein said combining means maximal-ratio combines reception power of the respective branches every subcarrier.

13. An OFDM transmitting and receiving method wherein an average value of reception power of each subcarrier is calculated, and said average value is multiplied by reception power of each subcarrier to calculate a coefficient.

* * * * *